(12) United States Patent
Gupta et al.

(10) Patent No.: US 11,539,582 B1
(45) Date of Patent: Dec. 27, 2022

(54) STREAMLINED ONBOARDING OF OFFLOADING DEVICES FOR PROVIDER NETWORK-MANAGED SERVERS

(71) Applicant: Amazon Technologies, Inc., Seattle, WA (US)

(72) Inventors: Diwakar Gupta, Seattle, WA (US); Upendra Bhalchandra Shevade, Washington, DC (US); Ximeng Simon Yang, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/461,785

(22) Filed: Aug. 30, 2021

(51) Int. Cl.
| | |
|---|---|
| H04L 12/28 | (2006.01) |
| H04L 41/0813 | (2022.01) |
| H04L 67/10 | (2022.01) |
| G06F 11/36 | (2006.01) |
| G06F 8/65 | (2018.01) |

(52) U.S. Cl.
CPC ........... *H04L 41/0813* (2013.01); *G06F 8/65* (2013.01); *G06F 11/362* (2013.01); *H04L 67/10* (2013.01)

(58) Field of Classification Search
CPC ....... H04L 41/0813; H04L 67/10; G06F 8/65; G06F 11/362
See application file for complete search history.

(56) References Cited

U.S. PATENT DOCUMENTS

| | | | |
|---|---|---|---|
| 9,125,047 B2 | 9/2015 | Sundaresan et al. | |
| 10,064,242 B2 | 8/2018 | Pawar et al. | |
| 10,244,507 B2 | 3/2019 | Tarlazzi et al. | |
| 10,257,105 B2 | 4/2019 | Majmundar et al. | |
| 10,594,456 B2 | 3/2020 | Park et al. | |
| 10,608,734 B2 | 3/2020 | Barbieri et al. | |
| 10,749,721 B2 | 8/2020 | Fertonani et al. | |
| 2018/0146375 A1* | 5/2018 | Pawar | H04W 12/062 |
| 2019/0165906 A1 | 5/2019 | Bala et al. | |
| 2019/0289497 A1 | 9/2019 | Rajagopal | |
| 2021/0006944 A1 | 1/2021 | Raghothaman et al. | |
| 2021/0271517 A1* | 9/2021 | Guim Bernat | G06N 3/08 |

OTHER PUBLICATIONS

U.S. Appl. No. 17/326,218, filed May 20, 2021, Ximeng Simon Yang.
U.S. Appl. No. 17/326,221, filed May 20, 2021, Ximeng Simon Yang.
U.S. Appl. No. 17/364,788, filed Jun. 30, 2021, Diwakar Gupta.
U.S. Appl. No. 17/364,789, filed Jun. 30, 2021, Diwakar Gupta.
U.S. Appl. No. 17/364,791, filed Jun. 30, 2021, Diwakar Gupta.
U.S. Appl. No. 17/364,779, filed Jun. 30, 2021, Diwakar Gupta.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.

* cited by examiner

*Primary Examiner* — Kim T Nguyen
(74) *Attorney, Agent, or Firm* — Robert C. Kowert; Kowert, Hood, Munyon, Rankin & Goetzel, P.C.

(57) ABSTRACT

A representation of a category of task offloaders is stored, in response to receiving a descriptor of the category, in a database of categories of offloaders which can be attached to servers of one or more classes. An indication of server configurations which include a task offloader of the category is provided via programmatic interfaces. A task is executed at a task offloader of a server with one of the server configurations.

20 Claims, 15 Drawing Sheets

STREAMLINED ONBOARDING OF OFFLOADING DEVICES FOR PROVIDER NETWORK-MANAGED SERVERS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

Figure 1:
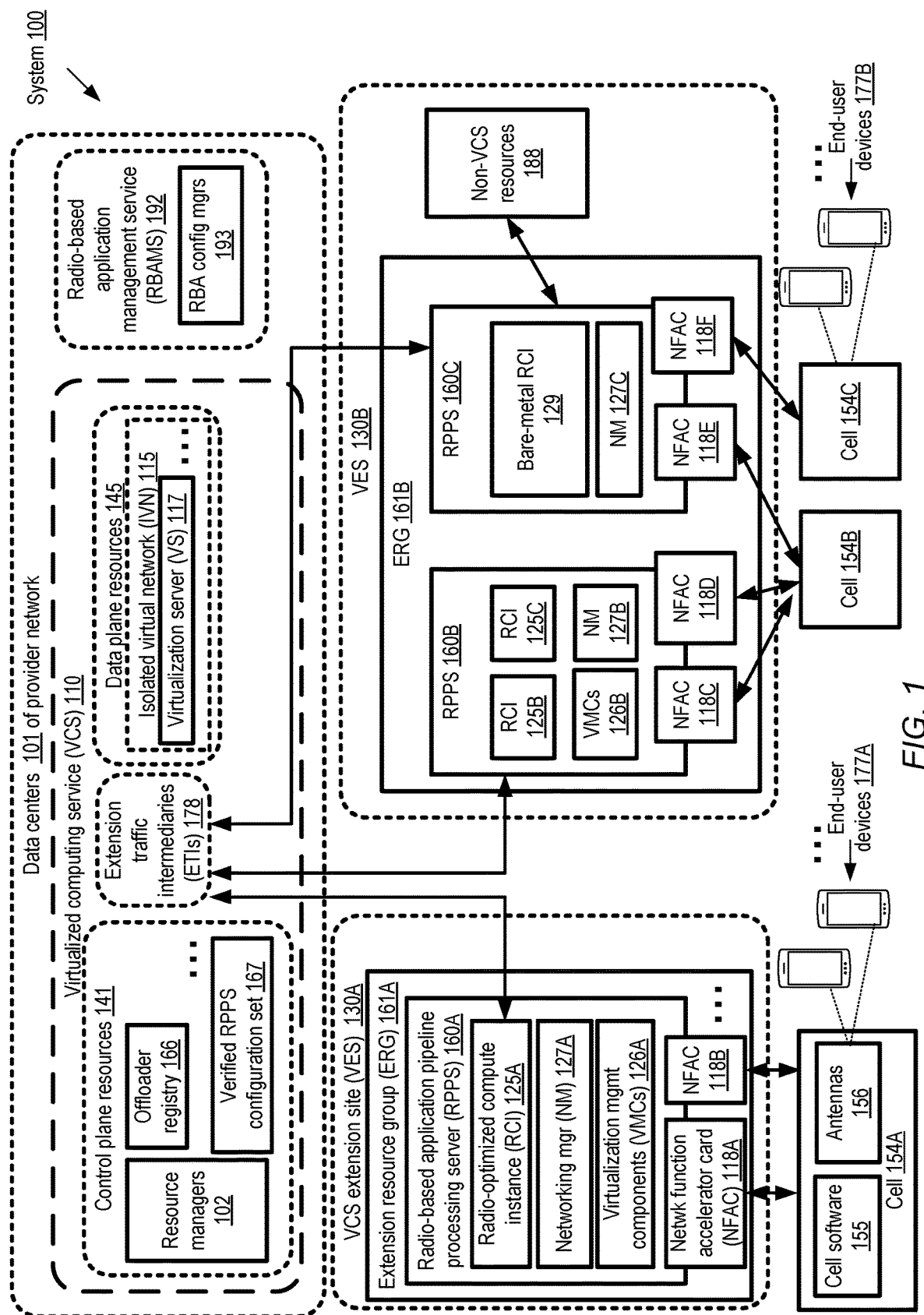
FIG. 1 illustrates an example system environment in which radio-based application pipeline processing servers may be deployed at extension sites of a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for automating and streamlining the process of defining, testing and validating configurations of cloud provider network-managed servers equipped with special-purpose offloading devices. The offloading devices (also called offloaders) can implement functionality required for various applications run on behalf of clients of the cloud provider network, including radio-based applications such as broadband cellular applications, IoT (Internet of Things) applications, and the like. The use of such offloaders reduces the amount of processing that has to be performed using primary processors (e.g., CPUs) of the servers, thereby freeing up the primary processors to execute other tasks. The offloading devices can be referred to as accelerators, as they can include custom hardware, firmware and/or software which results in improved performance for the overall application and for the offloaded subset of application functionality (e.g., lower latencies or higher throughput for the functions performed at the offloading devices) than if the primary processors were used for the functionality. After a configuration comprising some number of offloaders attached to a server, which may be proposed for example by a third-party vendor, is tested and validated by the cloud provider network, offloader-equipped servers with the validated configurations can be set up for use by applications of clients of the provider network. The process of testing and validating offloader-equipped servers can be referred to as "onboarding" of the offloaders. Automating the onboarding procedure using the techniques described herein allows new types of radio-based applications to be deployed more quickly than if the onboarding were not automated.

An offloader can be implemented using one or more hardware cards, which can for example be attached to the primary processors of a server using a peripheral interconnect. Hardware cards implementing offloaders designed for efficiently executing network functions of one or more layers of radio-based technology stacks such as 5G-RN (Fifth Generation New Radio) are referred to as network function accelerator cards (NFACs) or network function offloaders. Some NFACs may be designed and/or manufactured by an entity other than the operator of a cloud provider network, referred to as a third-party vendor. As part of an automated onboarding procedure for an NFAC, a third-party vendor may request that the NFAC be added to a registry or database of NFACs maintained at a cloud provider network. If the NFAC satisfies a first set of high-level guidelines (which may be determined using preliminary automated tests), the NFAC may be included in the registry. The third-party vendor may then propose one or more server configurations for detailed automated evaluation by the provider network. In a given server configuration proposed by the third party vendor, one or more of the registered NFACs are attached to a baseline server (i.e., a server belonging to a category of servers which the provider network operator can configure and manage on behalf of clients). Such an NFAC-equipped server is referred to herein as a radio-based application pipeline processing server or RPPS. At the provider network, a set of automated tests may then be conducted to ensure that the proposed server configurations satisfy detailed requirements (such as functional requirements, environmental requirements and the like) for inclusion in the provider network's supported fleet of managed servers. Descriptions of the validated configurations may be provided programmatically to clients of the provider network, enabling the clients to easily request servers with selected configurations for use, e.g., at premises external to the data centers of the provider network such as cell sites, point-of-presence locations and the like. After one or more offloader-equipped servers are deployed and activated at a premise indicated by the client, the applications of the clients can be started up, and application functions can be executed at the offloaders.

Over time, additional classes of servers may be added to the provider network's fleet of supported servers. In at least some embodiments, the provider network may proactively notify vendors on whose behalf an offloader category has been registered when new classes of servers compatible with that category of offloaders (i.e., servers to which the offloaders can be attached) become available. The decision as to whether a given offloader is compatible with a given server may be based on properties of the offloaders and servers (such as for example the kinds of peripheral connectivity supported by the server, the sizes of the server and the offloader, etc.). Such advance notifications may comprise one of the benefits of registering offloader categories from the perspective of the offloader vendors, as they may be provided more time to decide whether new server configurations comprising their offloaders should be added to the set of server configurations supported by the cloud provider network. Furthermore, because of the proactive notifications, the vendors may not need to track the changes to the classes of servers that the provider network supports.

As one skilled in the art will appreciate in light of this disclosure, certain embodiments may be capable of achieving various advantages, including some or all of the following: (a) enabling new radio-based applications to be brought online quickly and maintained using time-tested resource provisioning, scalability and availability techniques of provider networks, (b) reducing the computing, memory, storage resources and electrical power used for radio-based applications and/or (c) improving the user experience of clients and vendors of accelerators for radio-based applications, e.g., by simplifying the management and administration of the applications using provider network tools and interfaces. Note that although much of this description uses radio-based applications as the primary domain for which offloader onboarding can be automated, similar techniques may be employed with equal success for other domains. For example, onboarding of offloading devices used for machine learning model training or execution, online game playing, and the like may be automated using similar techniques in some embodiments. Furthermore, deployment of servers equipped with offloaders for which the proposed automated onboarding techniques are employed may not necessarily be restricted to premises external to the provider network; in at least one embodiment, such servers may be employed within data centers of the provider network.

According to at least some embodiments, a system may include one or more computing devices. The devices may store instructions that upon execution on or across the one or more computing devices obtain an indication of a registration request, submitted via one or more programmatic interfaces of a cloud provider network, for a first category of network function offloaders. In response to the registration request, a representation of the first category may be stored within a registry of categories of offloaders which can be configured for one or more classes of servers of the cloud provider network. In at least one embodiment, a registration request may indicate indicates one or more properties of the network function offloader category, such as (a) a type of network function which can be offloaded from primary processors of a server and implemented at network function offloaders of the first category and (b) a communication interface of the network function offloaders of the first category. The registration request may be submitted, for example, by a hardware vendor or manufacturer of the first category of network function offloaders in some embodiments. In other embodiments, a vendor of software executed at the network function offloaders may submit the registration request.

The cloud provider network may provide, via the one or more programmatic interfaces, an indication of one or more server configurations which include one or more offloaders of the registry and can be requested by clients of the cloud provider network in various embodiments. The one or more server configurations may include a first server configuration which includes (a) a server of a particular class of the one or more classes of servers and (b) at least one network function offloader of the first category of network function offloaders. The offloader may be connected to the primary processors of the server via a peripheral interconnect such as PCIe (Peripheral Component Interconnect-express), USB (Universal Serial Bus) or the like in some embodiments.

At least one server with the first server configuration may be deployed in various embodiments at the request of a client of the cloud provider network, e.g., at a premise external to the data centers of the provider network. A network function of the type of network function for which the offloader is designed may be executed using the network function offloader of the server. The network function may be communicated to the offloader via a communication interface of the type indicated in the registration request. A set of servers and other devices configured and managed by the provider network at a location or premise external to the provider network data centers may be referred to as an extension resource group (ERG) of the provider network, as the servers and devices extend a portion of the functionality of the provider network to the external premise.

In some embodiments, the server may have been deployed at the premise in response to a programmatic request which indicates a configuration identifier of the validated server configuration. The configuration identifier may be generated at the cloud provider network in some embodiments in response to verifying that the server configuration satisfies one or more validation criteria. Examples of the validation criteria may include, among others, (a) a thermal criterion, (b) a physical size criterion, (c) a metrics accessibility criterion, (d) a reset functionality criterion, (e) a debugging support criterion and/or (f) a software update support criterion in some embodiments. In at least one embodiment, the configuration identifier may be generated in response to a programmatic request from a vendor of the category of network function offloaders.

A network function is a functional building block within a network infrastructure, which has well-defined external interfaces and a well-defined functional behavior. Network functions can be chained together to form communications services. Network functions have historically been implemented as a physical network appliance or node, however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards, in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on an edge computing device or RPPS provisioned by a cloud provider, for example an edge device provisioned to a customer to implement a private 5G network, or used by a wireless service provider or the cloud provider to create a public 5G network. The term "radio-based application" (RBA) is used herein to refer to applications in which at least some messages are transmitted using radio frequency signals and associated antennas, such as those used for various generations (4G, 5G and the like) of cellular broadband technologies. RPPSs may also be referred to as radio access network (RAN) pipeline processing servers, RAN servers, RAN application servers, or as radio-based application servers. Note that the techniques described herein are not limited to offloaders implementing network functions of any particular generation of cellular broadband, nor are they limited to applications that utilize any particular portion of the electromagnetic spectrum for message transmissions. Any of a variety of network functions of a radio-based technology stack may be implemented at the network function offloaders of a given category in different embodiments.

According to one embodiment, a set of deployment requirements may be received via programmatic interfaces from a client at a cloud provider network. An analysis may be conducted at the provider network to a set of offloader-equipped server configurations suitable for fulfilling at least some of the requirements, and an indication of the server configurations may be provided to the client. In some cases multiple candidate server configurations may be identified in the analysis and indicated to the client, and the client may decide whether to request deployment of some subset of all of the candidate configurations. In some embodiments, the provider network may provide an indication of respective test results (e.g., on one or more application benchmarks) for one or more offloader-equipped server configurations to a client. A client may make a decision as to which server configuration they wish to request for deployment after receiving and reviewing such test results in such embodiments.

One or more extension resource groups or ERGs may be configured on behalf of clients at a premise external to the primary data centers of a provider network in various embodiments, e.g., in a location close to a set of cell towers or antennas, in response to programmatic requests from clients wishing to run radio-based applications using specified validated server configurations. An ERG can include radio-based application pipeline processing servers (RPPSs) equipped with NFACs at which network functions of one or more layers of radio-based or wireless application technology stacks such as 5G-RN are executed. In addition to or instead of one or more RPPSs equipped with one or more NFACs, an ERG may also include other categories of servers of the provider network, including servers which may not be equipped with NFACs but may nevertheless be employed for a subset of the tasks performed at radio-based applications or other applications. In some embodiments, servers equipped with other types of offloading devices than NFACs may be deployed for client applications; as such, RPPSs may represent just one of many examples of offloader-equipped servers that can be configured for clients by the provider network. A given RPPS can include several NFACs if desired, each of which in turn can be virtualized (e.g., carved into multiple logical slices for respective applications as needed) using software from a provider network operator in some embodiments.

An RPPS may be configured as a virtualization host of a virtualized computing service (VCS) of a provider network or cloud computing environment in some embodiments, and VCS compute instances (such as virtual machines or bare-metal instances) optimized for radio-based applications can be launched at an RPPS to run portions of the radio-based applications (RBAs) that are not offloaded to the NFACs, as well as other applications as desired. An RPPS may be configured to run various types of virtualized RAN network functions, and can be managed from the control plane or administrative components of the VCS and/or other services of the provider network (such as a radio-based application management service), thereby providing all the benefits of cloud-based services such as automated scalability, high availability, automated metrics collection and health management, and so on. In effect, an RPPS may be utilized as an extension of the data plane of a VCS, which is specially designed for radio-based applications.

An RPPS may serve as a source or destination of several different types of IP traffic in various embodiments, including traffic between different layers of a radio-based technology stack being used for RBAs, traffic to and from other resources within the provider network, traffic to and from resources in client networks established at client premises, traffic to and from the public Internet, and so on. In some embodiments, a given RPPS may be equipped with several different kinds of networking hardware devices (NHDs) which can be employed for the IP traffic, including for example default network interface cards, networking chipsets within NFACs, networking chipsets within virtualization management offloading cards, and so on. Network management logic provided by the provider network may be used to intelligently select the most appropriate NHD to be used for a given category of IP traffic of an RPPS during a given time interval in such embodiments, thus enabling the best use of the available IP networking resources of the RPPS to achieve quality of service targets of the applications being run at the RPPS. For example, depending on the types of RBAs being run, a different NHD can be used for front-haul traffic of the radio-based applications than is used for mid-haul traffic for at least some time periods.

Several different categories of ERGs for RBAs, differing from one another for example in their respective performance capacities for different types of network functions, as well as the amount of physical space needed for the ERGs, may be supported by a provider network in some embodiments. A client of the provider network may request a configuration of a particular category of ERG at a premise at one point in time, and then later request that at least a portion of the RBA(s) being run at that ERG be transferred or migrated to a different category of ERG which is also configured at the same premise on the client's behalf. Such migrations can be accomplished using state information transfer techniques that do not affect ongoing end user interactions of the RBAs—that is, the migrations do not cause interruptions or disruptions to end users.

A given RPPS or a given NFAC may be employed for several different RBA pipelines, e.g., on behalf of a single client of the provider network or on behalf of different clients. As a result of such multi-tenancy, the overall amount of computing resources and/or power consumed for implementation of several different RBAs can be reduced substantially. The reduction in the resources used, which can translate into lower costs, in turn enables new entrants into the radio-based application space, and the design of new types of applications.

One or more radio units (RUs) to which an RPPS is connected may implement a portion of the physical layer (the lowest layer) of a technology stack used for radio-based applications, such as a protocol stack used for 5G-NR. A given RU may, for example, include software, firmware and/or hardware components co-located with one or more antennas and/or cell towers in some embodiments, which collectively implement low-level functionality including analog/digital radio frequency (A/D RF) and digital/analog radio frequency (D/A RF) transforms. In some embodiments, an NFAC of an RPPS may be linked to the primary processors of the RPPS via peripheral interfaces such as PCIe (Peripheral Component Interconnect-Express), USB (Universal Serial Bus) or the like. NFACs may be referred to as radio pipeline offloading cards (RPOCs) or radio pipeline acceleration cards (RPACs) in some embodiments.

According to some embodiments, a provider network may comprise a radio-based application management service (RBAMS) which implements programmatic interfaces pertaining to the configuration of ERGs and/or individual RPPSs. An indication of an expected geographical distribution of end-user requests (e.g., cell phone calls, text messages, IoT sensor inbound and outbound messages, etc.) of a radio-based application may be obtained at the RBMAS via such programmatic interfaces. The information about the geographical distribution may be used at the RBAMS to select or recommend one or more premises at which ERGs and/or RPPSs of more categories supported by the provider network should be configured for the client. If the client indicates an approval of the recommendations, one or more ERGs comprising one or more RPPSs may be configured on behalf of the client at such premises and assigned to the clients' applications by the RBMAS in such embodiments. The premises may include, for example, a point-of-presence site of the provider network, a local zone premise of the provider network, or a client-owned premise.

In one embodiment, a given network function accelerator card (NFAC) (or a portion of an NFAC) may be configured for exclusive use for a single client of the provider network (or a single radio-based application of a client on whose behalf multiple radio-based applications are run), e.g., in response to a single-tenancy request from the client. Multiple NFACs of a single RPPS may be employed for a single radio-based application in some embodiments. In one embodiment, NFACs may be configured as backups to other NFACs, e.g., to be used in response to detecting failures or overloads at the other NFACs.

In at least some embodiments, a variety of metrics may be collected from the NFACs and provided to clients via programmatic interfaces if desired; such metrics may include inbound or outbound message transfer counts or message transfer rates, failure rates of NFACs, utilization levels of the local processors, memory and other resources of the NFACs, and so on in different embodiments. In one embodiment, metrics (e.g., resource utilization information) from multiple NFACs at an RPPS may be collected and used to select which particular NFAC should be utilized to execute a particular network function.

As mentioned above, an RPPS may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as an ERG of the kind described above. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a virtualized computing service (VCS) or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which radio-based application pipeline processing servers may be deployed at extension sites of a virtualized computing service, according to at least some embodiments. As shown, system 100 comprises resources and artifacts of a virtualized computing service (VCS) 110, distributed among data centers 101 of a provider network and VCS extension sites (VESs) 130. A radio-based application management service (RBAMS) 192, which includes a set of radio-based application (RBA) configuration managers 193, may also be implemented at least in part at the data centers 101 in the depicted embodiment. A given VES 130, at a location external to the provider network data centers, may comprise one or more extension resource groups (ERGs) 161 in the depicted embodiments, with each extension resource group in turn including one or more servers (such as RPPSs 160) at which compute instances of the VCS (such as radio-optimized compute instances 125) can be launched. For example, ERG 161A may comprise RPPS 160A at VES 130A, while ERG 161B may comprise RPPSs 160B and 160C at VES 130B.

In the embodiment depicted in FIG. 1, vendors or suppliers of network function accelerator cards (NFACs) or software/firmware used to implement network functions at such cards may submit registration requests to the VCS 110 via programmatic interfaces, indicating properties or capabilities of NFAC hardware and/or software that the vendors/suppliers wish to incorporate within one or more classes of RPPSs managed by the VCS. In response to such a registration request, which may for example indicate the types of network functions which can be implemented at a specified category of NFAC and thereby offloaded from the primary processors (e.g., CPUs) of an RPPS, communication interfaces (e.g., device-level I/O interfaces, networking interfaces for IP traffic etc.) of the NFAC category and/or other NFAC properties, a representation of the specified category of NFAC may be stored by the VCS in an offloader registry 166 in the depicted embodiment. In some embodiments, a preliminary automated check may be performed at the VCS to ensure that the specified category of NFACs satisfies a first set of high-level criteria defined and advertised by the VCS for registering NFACs.

A set of more detailed automated validation tests or operations may be conducted at the VCS in some embodiments after an NFAC category has been registered, e.g., in response to a programmatic request for an NFAC-equipped server configuration identifier. Such tests may, for example, include verifying that a baseline server of a particular class, when equipped with one or more NFACs of the category, satisfies a set of VCS acceptance criteria such as thermal criteria, physical size/dimensions criteria, metrics accessibility criteria, reset functionality criteria, debugging support criteria, criteria for supporting seamless software updates which do not impact running RBAs, and so on. A vendor or supplier of a registered category of NFACs may submit the request for the configuration identifier in some embodiments, indicating the class of baseline server to which an NFAC of the category should be attached for performing the acceptance tests. After an NFAC-equipped server configuration has been validated (e.g., after the configuration passes at least some of the acceptance criteria), the server configuration may be added to a verified RPPS configuration set 167 in the depicted embodiment, with a unique configuration identifier assigned to the configuration.

Clients of the VCS who wish to run their RBAs at VCS extension sites (VESs) 130 may be able to browse or search the verified RPPS configuration set 167 and/or the offloader registry 166 in some embodiments. The VCS may implement programmatic interfaces which can be used to provide one or more types of test results corresponding to various verified RPPS configurations in some embodiments, such as results of performance tests on benchmarks of interest to the clients, and the like. Using such test results and/or additional information provided by the VCS, a client may choose the particular verified RPPS configuration the client wishes to use for a given RBA in some embodiments. In at least one embodiment, a client may submit a set of RBA deployment requirements to the VCS via one or more programmatic interfaces, indicating for example expected geographical distributions and workload levels of various applications (e.g., private 5G networks, IoT based applications, 5G networks open to the general public, and so on) which are to utilize a radio-based technology stack such as the 5G-NR stack and the like. A resource manager 102 within the VCS and/or an RBA configuration manager 193 within an RBAMS 192 may analyze the requirements, and propose one or more recommended ERG configurations for use by the client, each comprising one or more RPPSs with configurations from the verified RPPS configuration set in such embodiments.

A client may submit a programmatic request to the VCS to establish an ERG with one or more verified RPPS configurations, e.g., using the configuration identifiers generated for the verified RPPSs in the embodiment depicted in FIG. 1. For example, RPPS 160A of ERG 161A deployed at VES 130A may have one of the verified RPPS configurations indicated in configuration set 167, while RPPSs 160B or 160C of ERG 161B at VES 130B may have other verified RPPS configurations in the depicted embodiment. Note that some verified RPPS configurations may include NFACs manufactured by or on behalf of the provider network operator; not all the NFACs employed at ERGs may be obtained from third-party vendors in some embodiments.

After an RPPS with a verified configuration is deployed at an ERG on behalf of a client, the RBA of the client may be activated in various embodiments. As part of the RBA, one or more network functions which had been indicated in the registration request for the NFAC(s) of the configuration may be executed at the NFAC(s) of the deployed RPPSs. In at least some embodiments, some or all of the network functions may be communicated to an NFAC via a communication interface which was also indicated in the registration request.

Clients of the provider network may select ERGs of one of more categories of a family of ERG categories supported by the VCS for a given VES, and request installation/ configuration of a given ERG via a single programmatic request directed to the VCS control plane in some embodiments. A given ERG may share some administrative resources among its member servers in some embodiment, such as a local agent of the VCS control plane. In at least some embodiments, the servers used for ERGs may be configured by the provider network operator with the appropriate hardware (e.g., including NFACs and/or other offloaders), software and firmware and then shipped to the VESs. In some embodiments, at least some of the servers such as RPPSs may require relatively little physical space (e.g., some RPPSs 160, supplied by the provider network operator, may only take up one rack unit (1U) or a small number of rack units in a standard data center rack).

A given radio-based application or RBA may be implemented as a pipeline of stages for processing messages in two directions—from programs implementing higher layers of the technology stack to end-user devices such as phones (referred to as the "downlink" direction), and from the end-user devices to programs implementing higher layers of the technology stack (referred to as the "uplink" direction). A given RBA may comprise components (e.g., respective sets of software programs and/or hardware devices) at several layers of the technology stack, including a radio unit (RU) layer, a distributed unit (DU) layer, and a centralized unit (CU) layer in various embodiments. At least a subset of these components (e.g., a portion or all of the DU layer and/or the CU layer) may be implemented at RPPSs in various embodiments. Results of the network functions run at the NFAC(s) of an RPPS may be transmitted to the appropriate destinations, such as execution environments at which RUs or CUs are run.

A given RPPS may be configured in single-tenant mode (in which case only a single radio-based application, or a set of radio-based applications of a single client are run using the RPPS) or in multi-tenant mode (in which radio-based applications of multiple clients can share the RPPS, or several radio-based applications of a single client can share the RPPS), e.g., based on the preferences of the clients. RPPSs may be configured to run numerous types of virtualized RAN network functions in different embodiments, e.g., with some of the virtualized RAN network functions being implemented within the radio-optimized compute instances (RCIs) 125, while others may be implemented at virtualization management components or other components of the RPPSs. The locations of the VESs may be selected based at least in part on geographical distribution information provided by clients in the depicted embodiment, and the number and type of ERGs/RPPSs/RCIs at each VES may be determined based at least in part on the anticipated workload levels or preferences indicated by the client. Different categories of verified RPPSs may comprise respective combinations of one or more network function accelerator cards (NFACs) 118, and the RBA configuration managers may identify the appropriate sets of RPPSs of one or more of the categories which should be configured for the client's needs. A given NFAC may comprise one or more hardware network function accelerators in some embodiments, as well as other components including networking hardware devices (NHDs) equivalent in functionality to network interface cards (NICs) as discussed below in further detail. Example VESs may include point-of-presence (POP) sites of the provider network, premises at which local zones of the provider network are established, cell sites which comprise antennas, client-owned premises including local data centers, co-location facilities at which equipment of several different organizations is located, and so on in different embodiments.

In at least some embodiments, an NFAC 118 may comprise an NHD (the equivalent of an embedded network interface card) which can be connected using one or more cables (e.g., fast Ethernet cables or similar cables) to an RU executing at a cell 154 used for a radio-based application, e.g., to ensure that low latency requirements of the lower layers of the radio-based technology stack can be satisfied. Such an NHD may be referred to as an NFAC-based NHD. An NFAC-based NHD may comprise multiple ports in some embodiments, each of which can be connected via a separate physical link or cable (e.g., an Ethernet cable) to another networking endpoint or device. An RPPS 160 may also include one or more other NHDs, which are not incorporated within an NFAC and hence may be referred to as non-NFAC NHDs, which can also be used for IP traffic or traffic transmitted via other protocols. For example, an RPPS may comprise one or more hardware network interface cards, or hardware network circuitry built in to virtualization management offloading cards of the kind described below in further detail. In embodiments in which the RPPSs are used for DU functions, several different types of network traffic may flow between the RPPSs and other servers/devices. In addition to the traffic between the DUs and RUs implemented at cells 154, network may also transmitted between the DUs and CUs, between an RCI at the RPPS and other data plane components of the VCS at the VCS data centers or at VCSs, between the RPPS and the VCS control plane, and between RPPSs and non-VCS resources 188 at the VESs in various embodiments. In at least some embodiments, respective networking managers (NMs) 127 may be instantiated at the RPPSs to select which particular NHDs (from among the non-NFAC NHDs and the NFAC-based NHDs) should be used for a particular category of traffic. RPPS 160A comprises NM 127A, RPPS 160B comprises NM 127B, and RPPS 160C comprises NM 127C in the depicted embodiment. In some embodiments, for example, while an NFAC-based NHD may be selected for front-haul traffic (traffic between the DU and the RU of an RBA) for at least some time period, a non-NFAC NHD may be used for mid-haul traffic of the RBA. Alternatively, in other embodiments, separate ports of an NFAC-based NHD may be used for front-haul traffic and mid-haul traffic for some time period, while other types of traffic may be transmitted using a non-NFAC NHD. A client may provide traffic distribution policies to the VCS via programmatic interfaces, indicating preferences for the types of NHDs to be used for different categories of traffic, and such policies may be implemented by NMs in conjunction with the VCS control plane.

An RCI represents one example of a runtime environment (RTE) within which software programs implementing portions or all of one or more layers of an RBA (e.g., a DU layer, or a CU layer) may be executed in various embodiments. Another example of such an RTE is a software container, which may itself be run within a compute instance. In at least some embodiments, the components of an RBA that were running initially at one RTE may be migrated to another RTE, e.g., because the other RTE comprises an upgraded version of software, because of an error or failure encountered at the first RTE, or for other reasons. One or more migration managers of the VCS, which may be implemented using software and/or hardware at the data centers of the provider network and may also comprise migration agents installed at the RPPSs, may orchestrate the migration of RBAs from one RPPS to another in some embodiments.

In response to programmatic requests from clients of the provider network, via network paths which do not include the RPPSs themselves, instance launch managers of the VCS (e.g., components of the resource managers 102) may launch one or more RCIs at the RPPSs on behalf of the clients in the depicted embodiment. For example, RCI 125A has been launched at RPPS 160A, RCI 125B and RCI 125C have been launched at RPPS 160B. In addition, RPPS 160C may comprise a bare metal radio-optimized compute instance 129, which may be granted permission to access NFACs such as NFAC 118E and 118F without the help of a hypervisor or other virtualization management components. RPPSs 160A and 160B may include a respective set of virtualization management components 126 in the depicted embodiment, such as VMCs 126A of RPPS 160A and VMCs 126B of RPPS 160B. In some embodiments, at least some networking managers 127 may be implemented as part of VMCs. Connectivity between the RPPSs and resources and services of the provider network data centers 101, including control plane resources 141 and data plane resources 145, may be managed by a set of extension traffic intermediaries 178 in conjunction with networking managers of the RPPSs in the depicted embodiment. At least some of the RPPSs 160 may be connected via local network links to resources that are not managed by the VCS control plane, such as servers owned/managed by clients or third parties. Such resources that are owned/managed by other entities may be referred to as non-VCS resources. RPPS 160C and/or other RPPSs may be linked to non-VCS resources 188 at VES 130B in the depicted embodiment, e.g., via NHDs selected by the NMs from among the set of NHDs available at the RPPSs.

The RCIs 125 may be referred to as radio-optimized in the depicted embodiment as they may comprise software designed specifically for executing pipelines of radio-based applications. For example, in some embodiments, respective request handlers may be launched within each RCI 125, which receive API requests for network functions of a radio-based application technology stack, and transmit the requests on to an offloading manager of the RPPS 160 at which the RCI is implemented. In scenarios in which multiple RCIs are run at a given RPPS (on behalf of different clients or the same client) as may be the case at RPPS 160B where RCIs 125B and 125C are run, a respective isolated request handler may thus be run on behalf of each of the respective radio-based applications run at the individual RCIs. In some embodiments, the request handlers may be implemented as privileged threads/processes within the operating system of the RCI.

In at least one embodiment, the offloading manager may comprise one or more threads/processes within a VMC 126 such as a hypervisor—e.g., VMCs 126A and 126B may each comprise an offloading manager. In a scenario in which a bare-metal RCI is used, the offloading manager may be implemented using one or more privileged threads/processes within the compute instance. In at least one embodiment, as indicated above, an RCI may also include one or more programs (e.g., user-mode or kernel mode programs) that implement higher-level functionality of a radio-based technology stack, such as at least a subset of L2 (Layer 2) or DU functionality of a 5G-NR stack, and such programs may transmit the network function requests to the request handlers via APIs. Clients may select the vendors whose programs they wish to use for stages of their radio-based application pipelines which are not processed by the network function accelerators available to the RCIs in various embodiments, and install the programs within their RCIs. In some embodiments such programs (e.g., for L2 functions of the 5G-NR stack) may be pre-installed by the VCS in an RCI, so installation of the programs may not be required from the clients. Clients may also run other applications, which are not part of a radio-based pipeline, at RCIs in various embodiments; as such, while an RCI may be optimized for radio-based application pipelines, additional applications may be run at the RCI as desired. In at least some embodiments, higher-layer components (such as CU components) may also be run at compute instances of RPPSs.

In some implementations, at least some NFACs 118 may comprise multiple network function accelerators (chipsets which can execute network functions independently of one another, and in parallel with one another if needed). A request handler may receive a request for a radio-based application task comprising one or more network functions from a programs running at an RCI, and pass on the request to the offloading manager in at least some embodiments. An offloading manager in turn may transmit a given network function request to a selected network function accelerator of a selected NFAC 118 in the depicted embodiment. At RPPS 160A, accelerators at NFAC 118A or NFAC 118B may be chosen to execute a given network function. Similarly, network functions of various client application pipelines being executed at RCIs 125B or 125C RPPS 160B may be sent to NFAC 118C or NFAC 118D, while network functions of one or more client application pipelines running at bare-metal RCI 129 may be sent to NFAC 118E or 118F. A network function for a downlink pipeline may be executed at an NFAC, and results of the execution may in at least some cases be transmitted to a radio-based application cell 154 (e.g., cell 154A, cell 154B or cell 154C). A given cell may comprise a set of radio antennas 156 and cell software 155, including for example radio units (RUs) of the physical layer of a radio-based application technology stack in the depicted embodiment.

In some embodiments, a multiplexer may be used as an intermediary between NFACs and RUs, so that network function results of several different applications executed at the NFACs in multi-tenant mode can be sent to the correct RUs. The antennas 156 may be used to transmit messages, generated for example at the cell software 155 based on input received from the NFAC, to an end user device such as devices 177A or 177B. End-user devices may, for example, include cell phones, tablets, laptops, IoT devices, wearable devices, augmented reality devices, virtual reality devices, game consoles, and the like. Messages sent by end-users via the devices 177 may be processed using the reverse path to that described above in various embodiments: e.g., the message contents may be obtained at the antennas, processed initially by cell software 155, sent to an NFAC 118A, and then passed on to other layers of the stack for further processing as part of the uplink path. The RPPSs and the cells may form part of a Radio Access Network (RAN), such as a 5G-RAN in the depicted embodiment. A RAN acts as an intermediary between end-user devices 177 and a network, such as the Internet, which can be used to transmit messages among different end-user devices.

The VCS 110 may comprise control plane resources 141, data plane resources 145, and extension traffic intermediaries 178 in the depicted embodiment. The control plane resources 141 of VCS 110 may include, among others, one or more resource managers 102, an offloader registry 166, and a verified RPPS configuration set 167. Each of these control plane resources may be implemented using one or more computing devices in various embodiments. The data plane resources may include a number of isolated virtual networks (IVNs) 115 in the depicted embodiment. An IVN 115 may comprise a set of resources that is logically isolated or separated from the rest of the resources of the VCS with respect to at least some types of networking configuration settings in various embodiments. For example, a given IVN may have one or more subnets with respective security settings, and/or a set of IP addresses, individual ones of which may be assigned to individual compute instances set up at one or more virtualization servers (VSs) 117 in some embodiments. Note that at least in one embodiment, at least some VSs 117 at provider network data centers may be used in a multi-tenant mode, so a given VS may potentially be used for compute instances set up on behalf of several different clients, with compute instances of several different IVNs potentially being instantiated on one VS.

One or more extension traffic intermediaries (ETIs) 178, implemented using one or more computing devices, which may be kept logically (and/or physically) separated from the servers and devices of the VCS control plane, may be used to transmit administrative commands from the VCS control plane to the RPPSs using secure networking channels in various embodiments. ETIs 178 may be configured, e.g., by setting properties of virtual network interfaces appropriately, so as to ensure that administrative messages cannot be directed back to the VCS control plane from the VESs via the secure networking channels in various embodiments, thus preventing administrative operations that could affect other customers from being initiated at a VES. In at least some embodiments, an individual ETI may comprise a virtual machine, with one or more virtual network interfaces attached to the virtual machine. A virtual network interface (VNI) may comprise a set of networking properties, including public and/or private IP (Internet Protocol) addresses, security settings, and the like that can be programmatically attached or associated with virtual machines in various embodiments. In at least some embodiments, the ETIs and/or the control plane servers may verify that secure network connectivity has been established between an RPPS and (a) the VCS control plane servers and (b) one or more radio units (RUs) of a radio-based application of a client, before the radio-based application can begin its normal operations.

In at least one embodiment, IVNs may be set up for internal or administrative use as well as for hosting client-requested compute instances. In some embodiments, for example, one or more of the ETIs 178 used for transmitting commands to RPPSs may be established within an IVN. A given ETI 178 may, for example, be implemented using one or more processes or execution threads within a compute instance of an IVN in some embodiments, and may be programmatically associated with at least one extension resource group comprising one or more RPPSs. In at least some embodiments, configuration settings of an ETI may be chosen such that while commands originating within the VCS control plane may be transmitted via the ETI to an RPPS, messages originating at the RPPS may not be transmitted via the ETI to the VCS control plane, e.g., based on security considerations. For example, in one embodiment security settings of a particular virtual network interface (VNI) attached to a compute instance being used as an ETI may only allow messages to be transmitted from the VCS control plane resources 141 to the ETI, and not in the reverse direction.

At a high level, in various embodiments, ERGs at VCS extension sites may be designed to provide secure data plane functionality of the VCS (e.g., the ability to instantiate compute instances identical to, or at least very similar to, those that can be set up within provider network data centers) at any location selected by a VCS customer that is capable of hosting at least a small amount of hardware equipment and has Internet connectivity. A number of techniques may be used to ensure that the quality of virtualized computing and other functionality that is provided at VESs (including aspects such as security, performance, availability, and the like) meets the standards of the VCS and the provider network in different embodiments. In addition to verifying the acceptance criteria described earlier for RPPS comprising NFACs registered on behalf of a vendor, for example, in at least some embodiments, the provider network operator may ensure that RPPSs comprise a number of hardware, software and/or firmware elements that are especially designed to enable remotely generated virtualization-related administrative commands to be executed in a safe and secure manner, without for example requiring messages to be sent back to the sources (such as control plane resources 141) from which the command were originally issued. In some embodiments, such elements may include offloaded virtualization management components (OVMCs) that include trusted platform modules (TPMs) or other security modules, tamper-resistant storage devices whose contents can only be decrypted as long as the storage devices are physically attached to a particular RPPS, a low-overhead virtualization management software stack, and so on, as discussed below in further detail. In at least some embodiments, an RPPS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an RPPS itself.

In some embodiments, a secure network channel, such as a virtual private network (VPN) tunnel or VPN connection, may be established between an RPPS 160 and resources located within the provider network data centers, and such a channel may be employed for sending commands from the VCS to the RPPS. In the embodiment depicted in FIG. 1, for example, respective one way secure network channels may be used to transmit commands originally generated at the control plane resources 141 in response to client requests (including requests to launch RCIs 125) via an ETI for eventual execution at an RPPS 160. In one embodiment, a secure channel to be used for such commands may be set up between one or more resources at an RPPS (such as a VCS connectivity manager, not shown in FIG. 1) and one or more resources within an IVN 115 of the client at whose request an RCI is to be launched at the RPPS.

In one example scenario, a client may programmatically submit a request to launch an RCI at an RPPS of a specified VES. A first version of a corresponding instance launch command may be generated at the VCS control plane resources 141 and transmitted to the appropriate ETI 178, and the ETI 178 may transmit a modified version of the command to the RPPS 160. One or more processes on the RPPS 160 may execute the command to launch the requested RCI. Similar workflows may be executed for other types of commands, such as commands to terminate an RCI, modify an RCI, and so on in various embodiments.

In some embodiments, the version of a command received at an ETI from the VCS control plane may be modified at the ETI, e.g., by removing/substituting one or more security-related tokens and the like, resulting in the transmission of a modified version of the command to the RPPS. The modified version of the command may include one or more security artifacts or objects, generated for example at the ETI, which can be authenticated at the RPPS. In at least one embodiment, respective authentication codes such as HMACs (hash-based message authentication codes) may be generated for each command at the ETI and included in the message forwarded to the RPPS, rendering it difficult to tamper with the commands.

In at least some embodiments, a given set of one or more RCIs may be configured as a logical extension of an existing IVN 115 established using at least some resources within the VCS data centers. As such, various networking configuration settings of the IVN, such as the available range of IP addresses, subnet settings, egress/ingress security rules and the like, may also be applied to the RCIs in such embodiments. In various embodiments, two-way data channels (set up for example with the help of networking managers 127 which choose the particular NHD for the channels) may be used to transmit non-administrative or data plane packets between resources within the IVNs and the RPPSs that are configured as extensions of the IVNs. Note that at least in some embodiments, the same set of physical network links and/or the same VPN tunnel or other secure connection may be used both for (a) two-way data traffic between a resource at an IVN at a provider network data center and an RCI and (b) one-way administrative command traffic between the VCS control plane and the RPPS at which the RCI is launched.

In some embodiments, RPPSs of an ERG may be pre-configured and pre-installed in such a way that very little effort may be required from VCS customers to establish connectivity and start using the RPPSs. For example, in one embodiment, as soon as an RPPS is powered up and physically connected to the Internet, a networking manager 127 may automatically start up at the RPPS and initiate connectivity with resources (such ETIs 178, gateways set up to enable VPN tunnels, etc.) at the provider network data centers. The discovery that power and/or an Internet connection is available may thus serve as a trigger signal to start up the network manager and the process of establishing connectivity with the data centers in such embodiments.

In some cases, an ERG whose RPPSs can be utilized for a client may already be set up, e.g., because other clients may also be utilizing the provider network for their own radio-based applications in the same locations, or because the same client already has one or more radio-based applications running at the same location. As such, already-installed RPPSs may be utilized for multiple applications and clients in at least some embodiments. In other cases, one or more new VESs may be established on behalf of a client in response to the geographical distribution and/or workload level information indicated by the client. For new VESs, or in scenarios in which additional RPPSs are to be configured at a pre-existing VES, the RPPS hardware may be shipped/transported to the new VES from the provider network.

Figure 2:
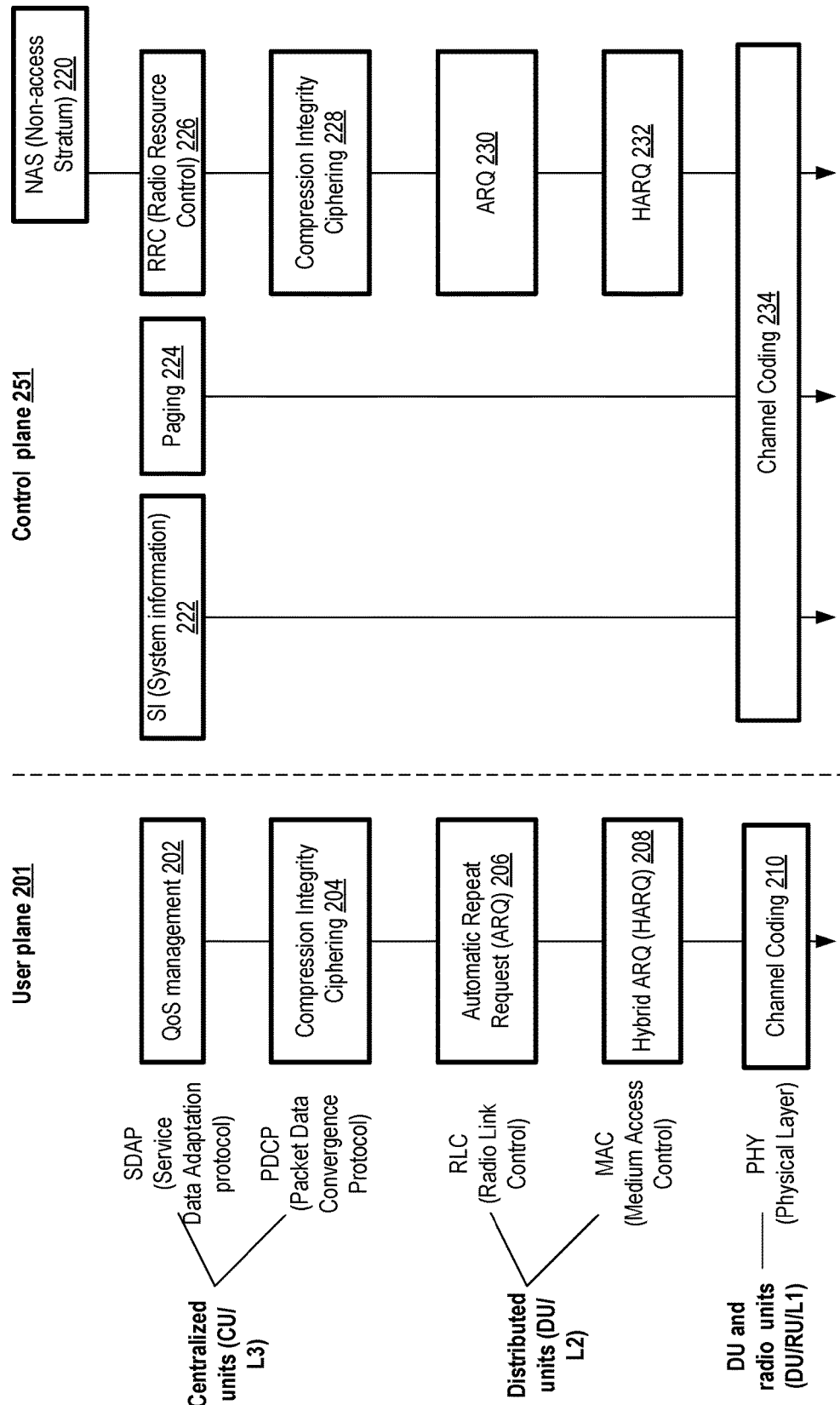
FIG. 2 illustrates an overview of user plane and control plane layers defined in accordance with a radio-based application technology standard, according to at least some embodiments.

FIG. 2 illustrates an overview of user plane and control plane layers defined in accordance with a radio-based application technology standard, according to at least some embodiments. The arrows shown in FIG. 2 represent the downlink communication path (from the higher levels of the standard, often implemented at back-end servers, downwards to the lower levels which are implemented using front-end components such as radio antennas and network function accelerators of the kind introduced above). The depicted layers conform to a 5G-NR standard published by 3GPP (Third Generation Partnership Project), a group of organizations responsible for defining protocols for mobile communications; similar layers are also defined for other generations of cellular communication technology.

In a manner somewhat analogous to the subdivision, discussed above, of a provider network functionality into control plane and data plane functionality, the operations needed for radio-based applications are divided into control plane operations and user plane operations. Control plane operations include connection configuration and other administrative tasks such as monitoring, while user plane operations involve transmission of user data using Internet Protocol (IP) packets.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 201 may include quality of service (QoS) Management 202 and Compression Integrity Ciphering 204 in L3, Automatic Repeat Request (ARQ) processing 206 and Hybrid ARQ (HARQ) processing 208 in L2, and Channel Coding 210 at the PHY layer. Operations of control plane 251 may include Non-access Stratum (NAS) 220 protocol tasks, System Information (SI) 222 tasks, Paging 224, Radio Resource Control (RRC) 226 and Compression Integrity Ciphering 228 in L3, ARQ 230 and HARQ 232 in L2, and Channel Coding 234 in the PHY layer. At least some of the layers and protocols shown in FIG. 2 may comprise the execution of respective sets of network functions. In at least some embodiments, a subset of the network functions corresponding to L1 and L2 may be implemented using accelerators/offloaders of the kind introduced above.

Figure 3:
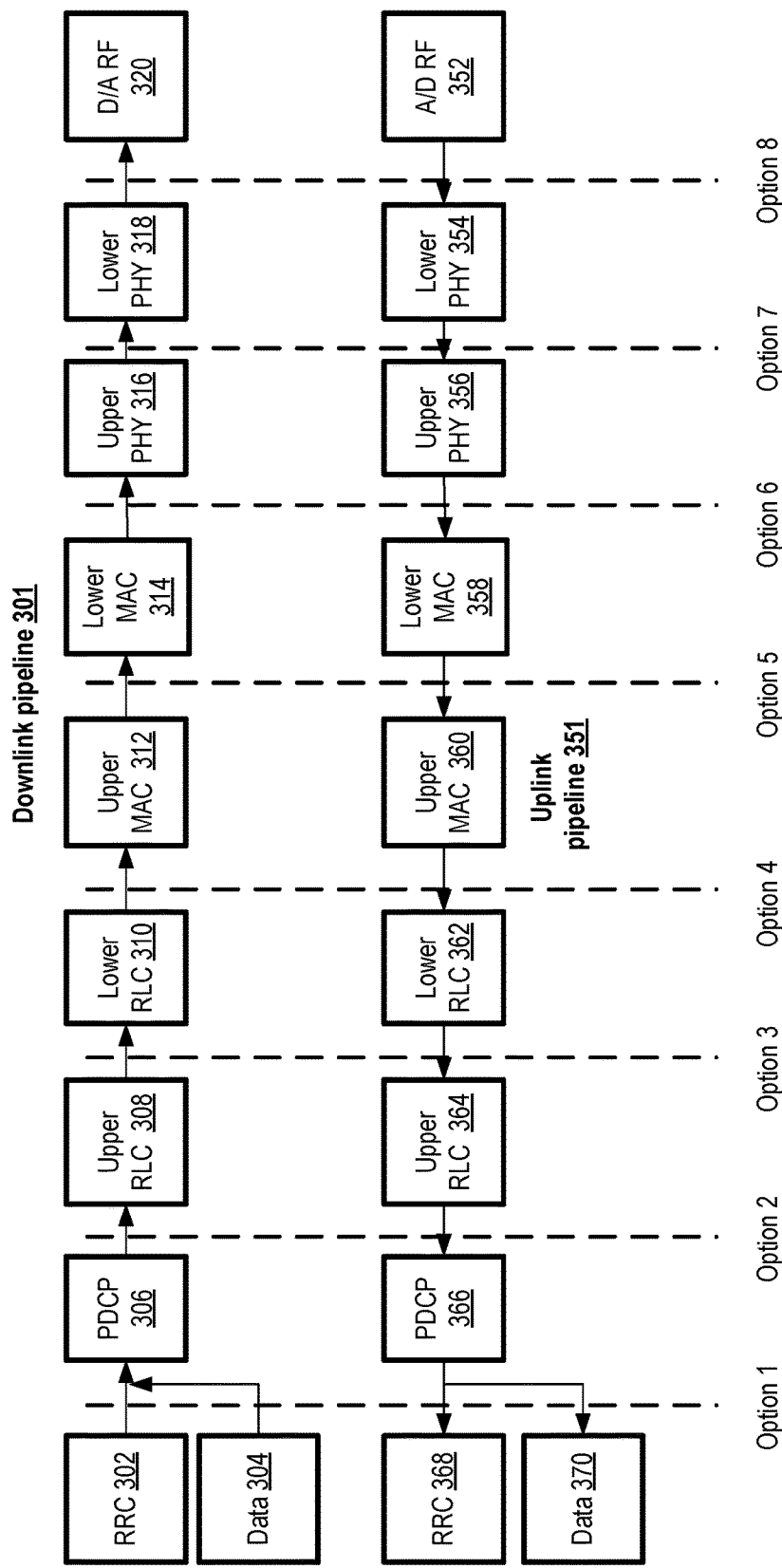
FIG. 3 illustrates example uplink and downlink pipelines of network functions for radio-based applications, according to at least some embodiments.

FIG. 3 illustrates example uplink and downlink pipelines of network functions for radio-based applications, according to at least some embodiments. Standards organizations have define several options for splitting the functions of the pipelines among the CUs (Centralized Units) and DUs (Distributed Units), which are indicated by the dashed line labeled Option 1, Option 2, . . . , Option 8 in FIG. 3. Such splits make it possible to distribute the workload for radio-based applications across several different devices, instead of relying on monolithic devices responsible for performing all the functions. Several more detailed options for splitting physical layer functionality among CUs and DUs, referred to as Options 7-1, Option 7-2 etc. as they are variations based on Option 7, are shown in FIG. 4.

The downlink pipeline 301 starts with RRC (Radio Resource Control) 302 and Data 304 and ends with digital to analog radio frequency (D/A RF) operations 320. In between, the downlink pipeline includes, in sequence, respective sets of network functions for PDCP (Packet Data Convergence Protocol) 306, Upper RLC (Radio Link Control) 308, Lower RLC 310, Upper Medium Access Control (MAC) 312, Lower MAC 314, Upper PHY (physical layer) 316, and Lower PHY 318 are executed. The uplink pipeline 351 starts with analog-to-digital radio frequency (A/D RF) operations 352, and ends with RRC 368 and Data 370. In between, network functions are executed in sequence for Lower PHY 354, Upper PHY 356, Lower MAC 358, Upper MAC 360, Lower RLC 362, Upper RLC 364, and PDCP 366. In various embodiments, at least some network functions of the Upper PHY and/or Lower PHY layers (for uplink and/or downlink) may be implemented using network function accelerators/offloaders of the kind discussed above. In some embodiments, network functions of the other layers shown in FIG. 3 may also be implemented at the accelerators or offloaders. In at least some embodiments, network functions of the RLC and MAC layers may be implemented using software running within radio-optimized compute instances (RCIs) of the kind shown in FIG. 1.

Figure 4:
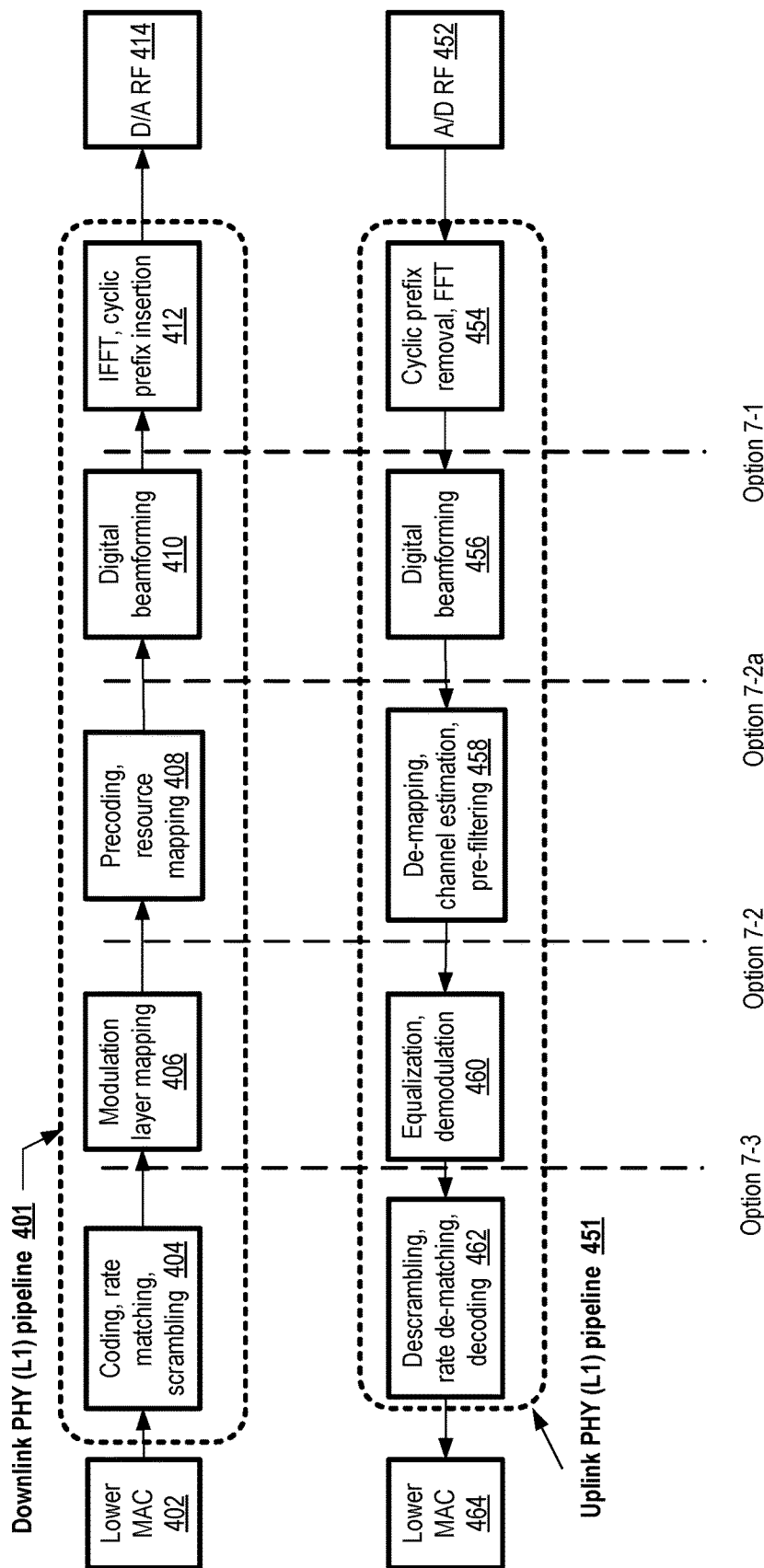
FIG. 4 illustrates example network functions which may be performed at a physical layer of a radio-based application technology stack, according to at least some embodiments.

FIG. 4 illustrates example network functions which may be performed at a physical layer of a radio-based application technology stack, according to at least some embodiments. In the downlink PHY (L1) pipeline 401, in which control and data messages are being sent from higher-layer components towards the RUs, the lower MAC stage 402 (which is part of L2) leads to a coding, rate matching and scrambling stage 404, followed by a modulation layer mapping stage 406. This is followed by a precoding and resource mapping stage 408, a digital beamforming stage 410, and an inverse Fast Fourier Transform (IFFT) and cyclic prefix insertion stage 412 before the digital to analog radio frequency (D/A RF) operations 414 are performed. In the reverse direction, when control signals and data are flowing from the radio units towards the L3 components of the pipeline, an analog-to-digital radio frequency operations (A/D RF) stage 452 is followed by cyclic prefix removal and Fast Fourier Transform (FFT) stage 454 of the uplink PHY (L1) pipeline. This is followed by another digital beamforming stage 456, a de-mapping, channel estimation and pre-filtering stage 458, an equalization and demodulation stage 460, and a descrambling, rate de-matching and decoding stage 462 before the Lower MAC stage 464 of L2 is reached.

Each of the stages in the uplink and downlink pipelines 401 and 451 may require a respective set of network functions to be executed. The split options 7-3, 7-2, 7-2a and 7-1 represent respective proposals for distributing the overall combination of network functions between "upper L1" (implemented at DUs) and "lower L1" (implemented at RUs). The stages of pipelines 401 and 451 to the left of a dashed line indicating a split option are considered part of the upper L1, while the stages to the right are considered part of the lower L1. Thus, in the 7-2 split, stages 408, 410, 412, 454, 456 and 458 may be the responsibility of the RUs, with the remaining stages being the responsibility of DUs. In various embodiments, the network function accelerators/offloaders utilized at radio-based pipeline processing servers (RPPSs) may execute network functions of at least some of the pipeline stages shown in FIG. 5 using custom chipsets. For example, network functions implemented at an accelerator may include one or more of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function. In at least some embodiments, the network function accelerators may implement DU functionality. In some embodiments, at least a portion of CU functionality may be implemented at RPPSs in addition to DU functionality.

Figure 5:
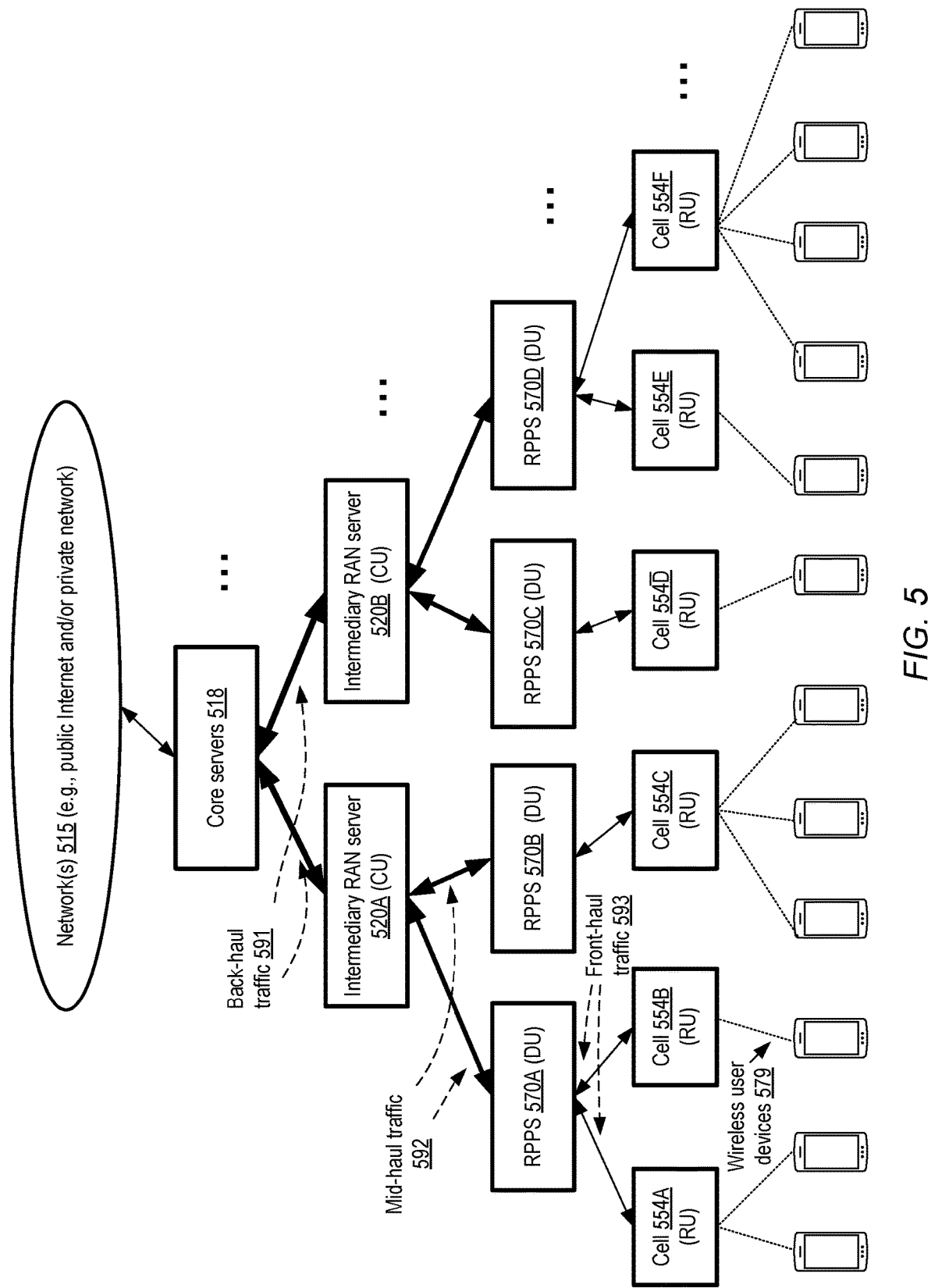
FIG. 5 illustrates an example hierarchy of devices which may be used for radio-based applications, according to at least some embodiments.

FIG. 5 illustrates an example hierarchy of devices which may be used for radio-based applications, according to at least some embodiments. In the depicted embodiment, core servers 518, linked to one or more networks 515 used to transfer the Internet Protocol packets comprising the payloads and control signals of the applications over large distances, may implement a set of back-end functions associated with radio-based applications, enabling different sub-networks of the overall system to communicate with one another. Network functions performed at the core servers (referred to as core network functions) may for example include functions to aggregate data traffic from end user devices, authenticate subscribers, apply personalized policies, and/or manage the mobility of devices prior to routing traffic to operator services or the Internet. A given core server 518 may, for example, be located at a provider network data center in one embodiment. The core server may be connected to one or more intermediary RAN servers 520, such as 520A and 520B in some embodiments, at which additional central unit (CU) functionality may be implemented. The traffic between the core servers 518 and the Intermediary RAN servers 520 may be referred to as backhaul traffic 591 in the depicted embodiment. An intermediary RAN server may, for example, be located within a premise at which one or more VCS extension sites (VESs) similar to the VESs 130 of FIG. 1 are implemented, or at a premise which is located close to such VESs.

In the embodiment depicted in FIG. 5, distributed unit (DU) functionality of the radio-based application technology stack may be implemented at RPPSs 570 (similar in functionality to RPPSs 160 of FIG. 1 with verified configurations comprising registered NFACs). Each intermediary RAN server 520 may be linked to one or more RPPSs—e.g., intermediary RAN server 520A may be connected to RPPS 570A and RPPS 570B, while intermediary RAN server 520B may be linked to RPPS 570C and RPPS 570D. The traffic between CUs and DUs may be referred to as mid-haul traffic 592 in various embodiments. Each of the RPPSs in turn may be linked, e.g., using physical network interfaces incorporated within their network function accelerator cards (NFACs), with radio units (RUs) at devices of one or more cells 554. For example, RPPS 570A may be linked to radio units at cell 554A and 554B, RPPS 570B may be linked to radio units at cell 554C, RPPS 570C may be linked to radio units at cell 554D, and RPPS 570D may be linked to radio units at cell 554E and 554F. The traffic between DUs and RUs may be referred to as front-haul traffic 593. Each of the cells may comprise one or more antennas which can be used to receive and transmit radio frequency signals from a variety of wireless user devices 579. In some embodiments in which the radio-based pipeline accelerator cards (NFACs) of the RPPSs comprise physical network interface chipsets for low-latency networking with the RUs, the physical network interface chipsets may be referred to as "front-haul accelerators" or "front-haul traffic accelerators". In some embodiments, RPPSs, intermediary RAN servers, and core servers may all be implemented at least in part using provider network resources. According to one embodiment, an RPPS may be used to run at least some core network functions (the functions run at the core servers 518). In one embodiment, at least some of the functionality of the cells 554 may also be implemented using provider network resources. In at least one embodiment, RPPSs may also be used to implement at least a subset of CU functionality.

Figure 6:
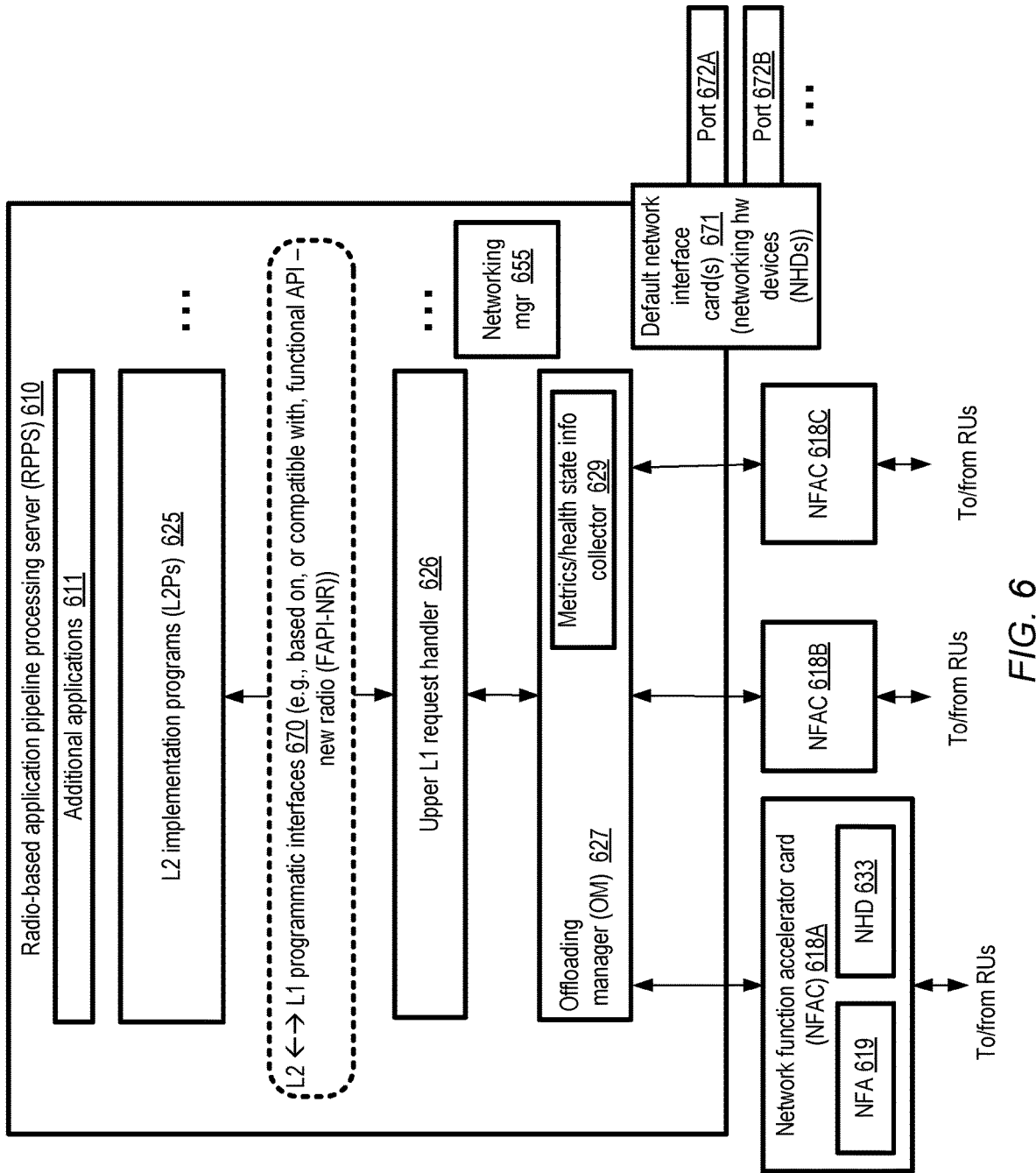
FIG. 6 illustrates example subcomponents of a radio-based application pipeline processing server, according to at least some embodiments.

FIG. 6 illustrates example subcomponents of a radio-based application pipeline processing server, according to at least some embodiments. In the depicted embodiment, a radio-based application pipeline processing server (RPPS) 610 comprises a set of programs for the L2 layer, L2Ps 625, of one or more radio-based application (RBA) pipelines. L2Ps 625 may have been developed by a third-party vendor or software provider in some embodiments, or by the provider network. In at least some embodiments, L2Ps of an RBA pipeline may be launched within a compute instance (such as a radio-optimized compute instance similar to RCI 125A of FIG. 1).

In the embodiment depicted in FIG. 6, a request handler may be launched at the RPPS for the RBA pipeline. Upper L1 request handler 626 may be used for processing/forwarding requests generated at L2Ps 625 for network functions. In embodiments in which the RPPS is being used in multi-tenant mode for multiple RBA pipelines, a respective upper L1 request handler and a set of L2Ps may be instantiated for each of the pipelines. The request handlers may be isolated from one another in respective runtime environments, e.g., as part of respective compute instances or software containers with address spaces that cannot be accessed from other execution environments. In some embodiments, a request handler 626 may comprise one or more privileged threads or processes, running within the same runtime environment as their corresponding L2Ps. Each of the request handlers 626 may comprise software developed at the provider network in the depicted embodiment, e.g., as opposed to the L2Ps which may have been developed by entities other than the provider network operator.

A request handler 626 may receive requests for upper L1 network functions from L2Ps 625 for the downlink portions of the RBA pipeline, e.g., via a set of L2-L1 programmatic interfaces 670 designed and implemented at the provider network in some embodiments. The programmatic interfaces 670 may, for example, be based on, or compatible with a standard such as FAPI-NR (functional API—new radio) in at least some embodiments. In one embodiment, the programmatic interfaces 670 may be published or otherwise communicated by the provider network to external organizations, thus enabling vendors of L2Ps to develop code which can be used with the RPPS upper L1 request handlers. Note that the number of L2Ps and request handlers executed at a given RPPS 610 may vary, e.g., based on the number of provider network clients which wish to implement their radio-based applications in the same vicinity; for example, more than two L2Ps and corresponding request handlers may be launched at an RPPS, or a single L2P and a single request handler may be launched. In some embodiments, APIs of a different boundary layer of a radio-based technology stack (i.e., not necessarily the L2-L1 interface) may be implemented by request handlers.

An offloading manager (OM) 627 may be launched at the RPPS 610 in at least some embodiments, e.g., as part of a virtualization management component such as a hypervisor. The offloading manager 627 may act as an intermediary between the request handlers and a set of network function accelerators (NFAs) such as NFA 619 implemented at one or more network function accelerator cards (NFACs) 618 of the RPPS 610 in the depicted embodiment, e.g., in a manner somewhat analogous to the way that hypervisors and other virtualization management components at a general-purpose virtualization host or server can act as intermediaries between software and hardware components. An NFAC may be linked to the primary processors (e.g., CPUs) of an RPPS via a peripheral interconnect such as PCIe, USB or the like in at least some embodiments. NFACs 618 may belong to a registry of NFACs maintained by the VCS as described above in various embodiments, and configurations of RPPSs similar to RPPS 610 (e.g. the combination of NFACs which are attached to a baseline server to obtain an RPPS similar to RPPS 610) may be verified at the VCS using a set of automated tests before the RPPS 610 is deployed on behalf of the client.

The OM may receive L1 network function requests sent from the request handler 626 for all the downlink pipelines being implemented using RPPS 610, determine the particular NFAC and/or the particular NFA which should be utilized for a given network function, and transmit the request to that NFAC/NFA for execution in the depicted embodiment. For example an NFA at NFAC 618A may be selected for one request from request handler 626, and an NFA at NFAC 618B or 618C may be selected for another request from the request handler. The results of the execution of a network function may be transmitted to one or more radio units of one or more cells from the NFAC in some embodiments. For messages flowing from the antennas towards the L2 and L3 layers of the application pipelines (uplink pipeline messages), the workflow may be reversed—the incoming messages may be transmitted to an NFAC from the RUs, one or more network functions may be executed at the NFAC, and the results may be forwarded via the OM and/or the request handlers to the L2Ps. The L2Ps may then transfer the results of L2 processing further up the stack, e.g., to L3 or CU implementation programs at other RPPSs, intermediary RAN servers and/or at core servers.

The OM may include a metrics/health state information collector 629 in at least some embodiments, which keeps track of the resource utilization levels of the NFACs (e.g., including utilization levels of on-card processors, memory and the like), failures (if any) of NFAC components, latencies for completing network function processing at NFACs, and so on. Such metrics may be used to make various configuration decisions, such as which particular NHD or NFAC should be used for a given type of network communication or network function, RBA workload migration decisions, whether a given network function should be executed locally or transmitted for remote execution to another server, and so on in different embodiments.

RPPS 610 may comprise one or more default network interface cards 671 (also referred to as networking hardware devices or NHDs) in the embodiment depicted in FIG. 6. In addition, one or more NHDs may also be implemented as part of NFACs 618, such as NHD 633 of NFAC 618A. RPPS 610 may also include a networking manager 655 in the depicted embodiment, responsible for managing network connectivity with a variety of other devices/servers. The networking manager 655 may be responsible for selecting the particular NHD (e.g., a default NIC or a NFAC-based NHD) to be used for traffic directed to a particular category of destination in various embodiments. A given NHD may comprise several different ports, such as ports 672A and 672B in the depicted embodiment, which enable connectivity to be established with several different network endpoints or networking devices such as routers/switches using that NHD.

The specific NFAC or NFA for a given request may be selected by the OM based on any combination of a variety of factors in different embodiments. For example, in some embodiments, a given L2P may be associated with at least one NFAC at the request of the client on whose behalf the L2P is run, so the NFAC selected for a given network function request may be based at least in part on the L2P from which that network function was requested. In some cases, a given NFAC may be assigned for exclusive use on behalf of a given radio-based application or a given client of the provider network. Metrics collected from the NFACs could be used to select the NFAC to which a given network function request is directed in some embodiments, e.g., the NFAC with the lowest recent resource utilization levels may be selected in preference to other NFACs.

Each of the radio-based applications whose pipelines are being executed at the RPPS may belong to one of a set of application areas with respective expectations regarding performance and other quality of service considerations in the depicted embodiment. The ITU-R (International Telecommunication Union-Radiocommunication sector) standards organization has defined at least three such application areas for 5G cellular communication: enhanced mobile broadband (eMBB), massive machine-type communications (mMTC), ultra-reliable and Low Latency Communications (URLLC). An NFAC (or an NFA within an NFAC) may be selected for at least some of the network functions of an application by the OM based on the application area to which the application belongs in some embodiments.

The RPPS may also be used for one or more additional applications 611 on behalf of one or more clients, such as applications that do not require the execution of L1 and L2 network functions. As a result of offloading at least some of the L1 network function workload to NFACs, more of the primary processors (CPUs, GPUs etc.) of the RPPS may become available for such additional applications in various embodiments.

In various embodiments, RPPSs similar to RPPS 610 may provide an implementation of Open Radio Access Network (O-RAN), a disaggregated approach to deploying mobile front-haul and mid-haul networks built on cloud native principles. O-RAN is an evolution of the Next Generation RAN (NG-RAN) architecture, first introduced by the 3GPP. Organizations such as the O-RAN Alliance have developed standards for O-RAN, and the RPPSs may be designed to comply with such standards in at least some embodiments.

Figure 7:
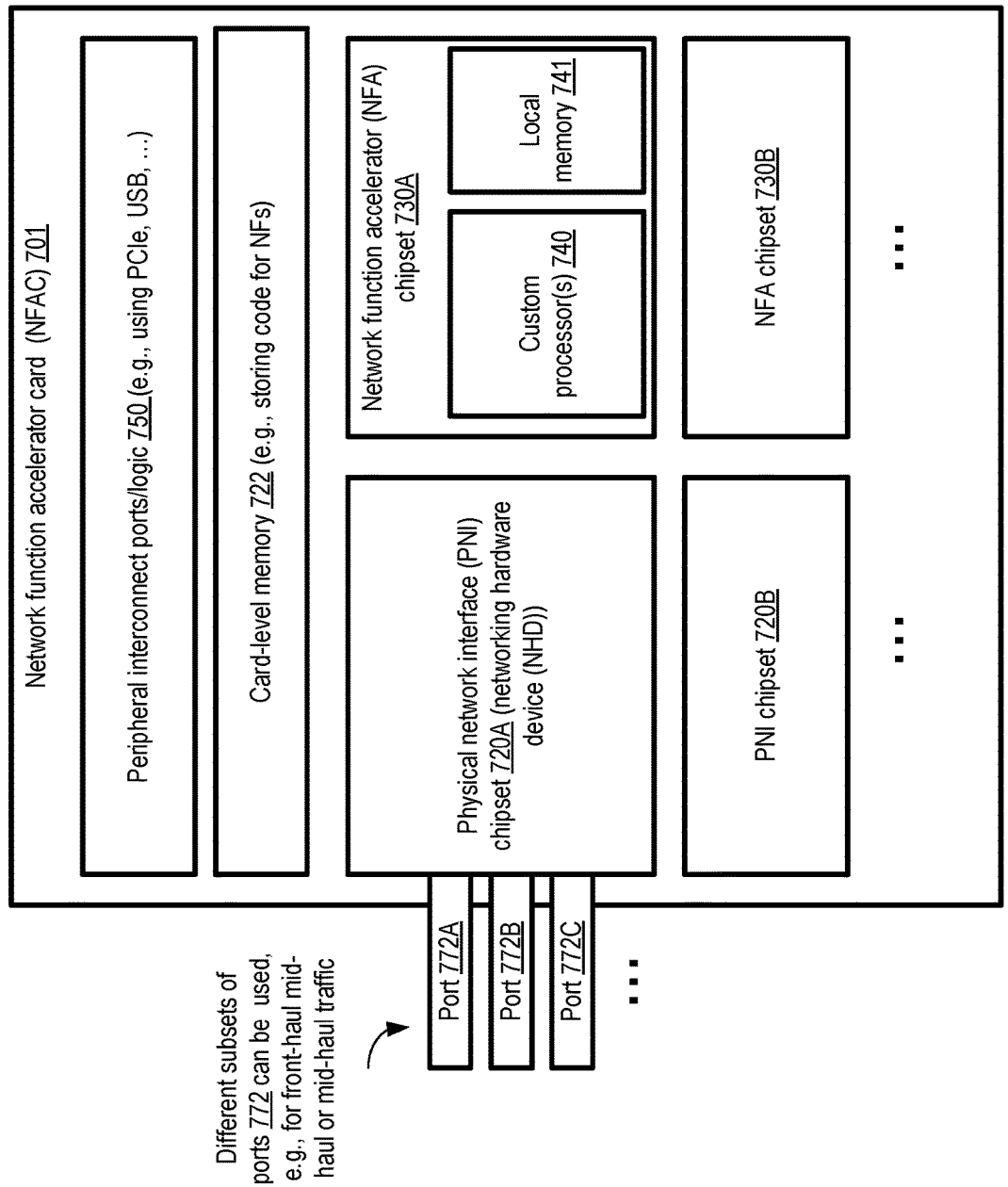
FIG. 7 illustrates example elements of a network function accelerator card which may be employed at a radio-based application pipeline processing server, according to at least some embodiments.

FIG. 7 illustrates example elements of a network function accelerator card which may be employed at a radio-based application pipeline processing server, according to at least some embodiments. As shown, NFAC 701 may comprise peripheral interconnect ports/logic 750, card-level memory 722, one or more physical network interface (PNI) chipsets 720, and one or more network function accelerator chipsets 730 in the depicted embodiment. The peripheral interconnect ports and logic may be utilized to connect the NFAC to the primary processors of the RPPS in various embodiments. Any of a variety of peripheral interconnects, such as PCIe, USB, or custom interconnects developed by the provider network operator or third parties may be used in different embodiments.

PNI chipsets 720A or 720B may each include components similar in functionality to a network interface card (NIC) of general purpose computing devices in at least some embodiments, and may thus represent one of the networking hardware devices (NHDs) available at an RPPS for IP communications (or communications using other networking protocols). The PNI chipsets 720 may be used for low-latency real-time communications over physical links with the RUs (and/or other components of the cells) of the radio-based applications in the depicted embodiment, and may also be used for communications with CUs at other servers in some embodiments. In the embodiment depicted in FIG. 7, a given PNI chipset 720 may comprise multiple hardware ports such as ports 772A, 772B and 772C. Different subsets of the ports 772 may be utilized for respective types of network traffic of an RPPS—e.g., some ports may be used for front-haul traffic, others for mid-haul traffic, and so on. In some embodiments, the physical links attached to the ports for network connectivity may for example include Ethernet cables. In at least one embodiment, the latency requirement or limit for messages between the NFAC and the RUs, satisfied using the PNI chipsets 720, may be as low as a single millisecond or even a fraction of a millisecond.

NFA chipsets 730, such as 730A or 730B may include custom processors 740 (e.g., including digital signal processors (DSPs), custom application-specific integrated circuits (ASICs), field-programmable gate arrays (FPGAs)) or the like, as well as local memories 741 in at least some embodiments, storing the instructions that may be used for the network functions. The card-level memory 722 may be shared among the NFA chipsets of the NFAC in some embodiments, and may for example be used at least temporarily to store at least some custom logic specified by clients for implementing network functions at the NFAs. In some embodiments, an NFAC may comprise only a single PNI chipset and/or only a single NFA chipset. In at least one embodiment, a card-level memory may not be incorporated within an NFAC. In some embodiments, at least a portion of an NFAC may be implemented as a system on a chip (SOC).

Figure 8:
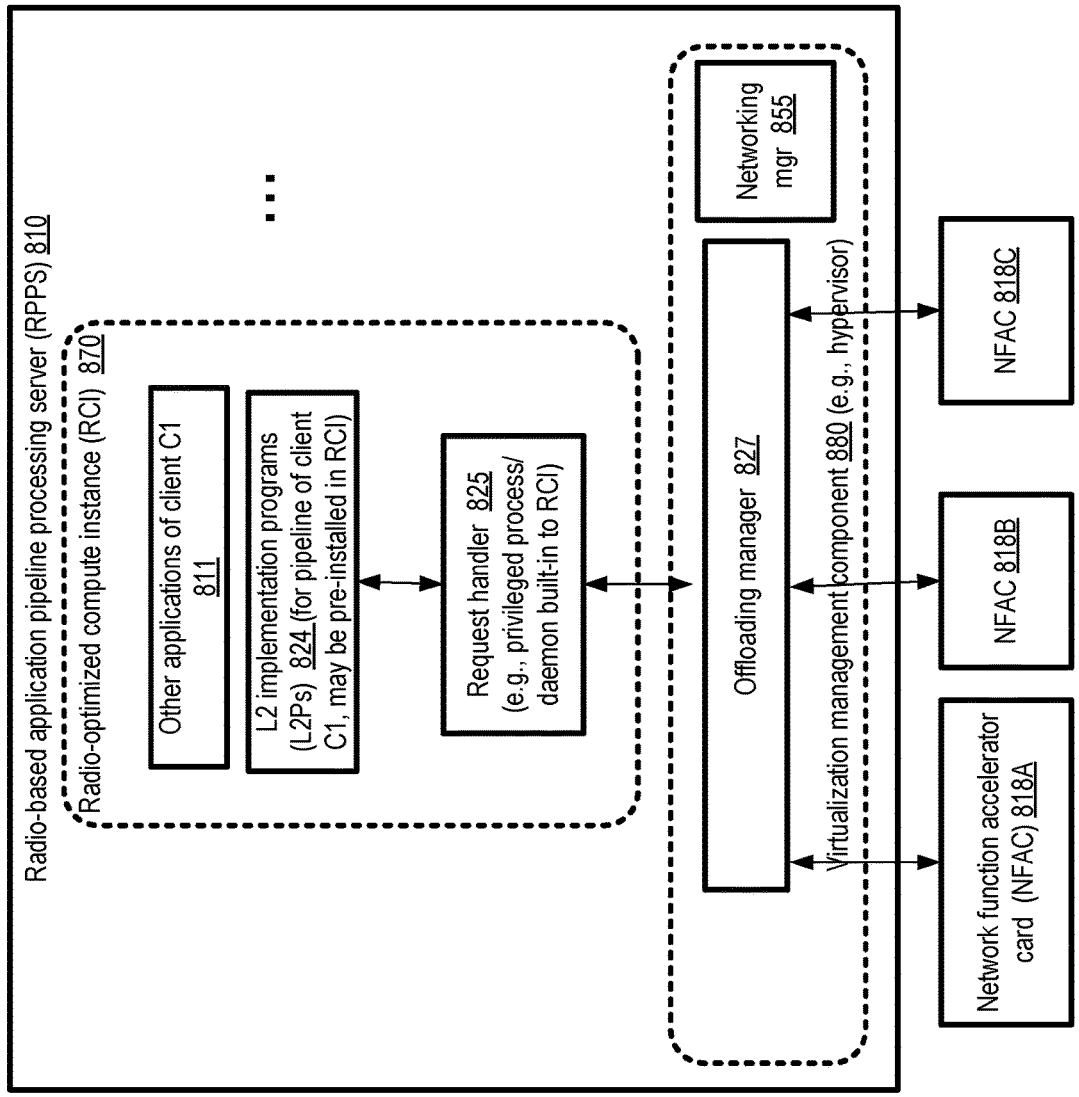
FIG. 8 illustrates an example configuration in which an offloading manager may be implemented at a virtualization management component of a radio-based application pipeline processing server, according to at least some embodiments.

FIG. 8 illustrates an example configuration in which an offloading manager may be implemented at a virtualization management component of a radio-based application pipeline processing server, according to at least some embodiments. An RPPS 810 comprises one or more radio-optimized compute instances (RCIs) 870 in the depicted embodiment, with RCI 870 created at the request of a client C1 of a provider network for a particular RBA. Additional RCIs 870 may also be set up at the same RPPS 810 in some embodiments, e.g., for other RBAs of the same client or for RBAs of other clients. RCI 870 comprises L2Ps 824 for L2 network functions of a radio-based application pipeline of client C1. In at least some embodiments, L2Ps may be built-in or pre-installed within RCIs; for example, the provider network may offer its clients the option of launching an RCI with L2 software from a specified vendor. Alternatively, in some embodiments, clients may launch L2 software programs of their choice at an RCI after the RCI has been launched at an RPPS. In at least some embodiment, a client may permit the VCS to configure an RPPS in multi-tenant mode and utilize the RPPS for multiple applications.

In the depicted embodiment, RCI 970 comprises a request handler 825 used for forwarding at least some L1 network function requests of client C1's pipeline to NFACs via an offload manager 827. The request handler may be implemented as one or more privileged processes, threads or daemons in some implementations within the operating systems used for the RCIs. In scenarios in which multiple RCIs are launched at the same RPPS, each RCI may comprise a respective request handler, and the request handlers may in effect be isolated from one another, since each RCI may be implemented as a distinct virtual machine with its own address space. As a result, it may not be feasible for data or network function requests of one RBA pipeline to be accessed by a request handler configured for a different pipeline, thus enhancing security for the different pipelines. RCI 970 may also be utilized, if desired, to run one or more other applications 811 of client C1.

The offloading manager which acts as an intermediary between the request handler(s) and a set of NFACs 818 of RPPS 810, such as NFAC 818A, 818B or 818C, may be implemented as one or more processes or threads within a virtualization management component 880 of the RPPS in the depicted embodiment. In some embodiments, for example, the offloading manager may be implemented as part of a hypervisor. Communications with the offloading manager 827 may require special privileges or permissions, which are granted to request handlers 825 but not to other processes or threads in at least some embodiments.

In some embodiments, software containers may be used as the isolated runtime environments (also referred to as execution environments) for respective combinations of L2 programs and request handlers instead of RCIs. Thus, for example, an L2 implementation program and a request handler for client C1's pipeline may be incorporated within one software container SC1 running at an RPPS. In the embodiment depicted in FIG. 8, a networking manager 855 may also be instantiated at the RPPS 810, e.g., as part of a virtualization management component 880. The networking manager 855 may be responsible in the depicted embodiment for connectivity with various types of other endpoints, and may for example choose the particular NHD to be used for a particular type of network traffic such as mid-haul traffic or front-haul traffic.

Figure 9:
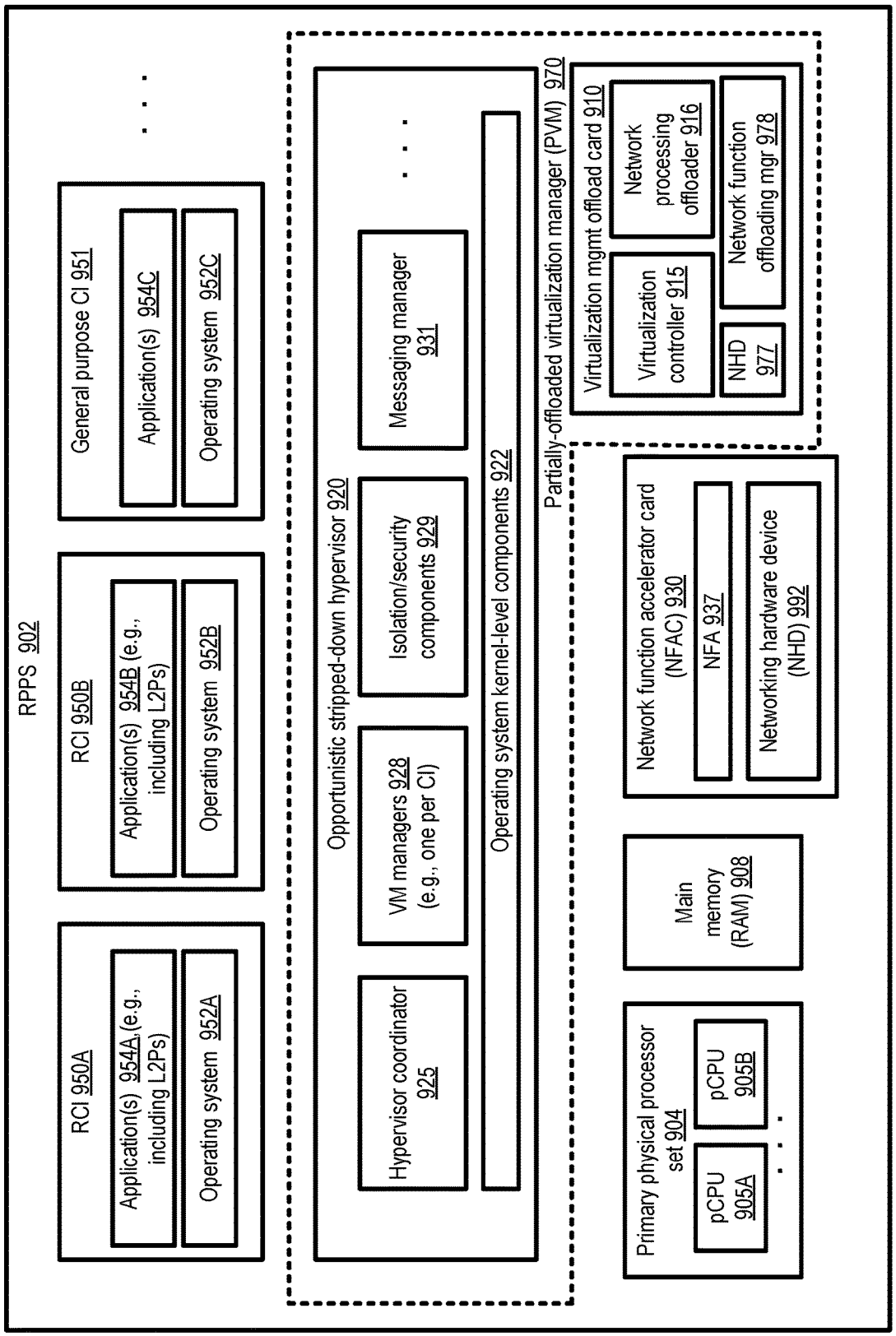
FIG. 9 illustrates an example configuration in which a partially offloaded virtualization manager may be implemented at a radio-based application pipeline processing server, according to at least some embodiments.

FIG. 9 illustrates an example configuration in which a partially offloaded virtualization manager may be implemented at a radio-based application pipeline processing server, according to at least some embodiments. As shown, RPPS 902 may comprise a primary physical processor set 904, a main memory (e.g., one or more modules of random access memory or RAM) 908, a network function accelerator card (NFAC) 930, a partially-offloaded virtualization manager (PVM) 970 and one or more radio-optimized compute instances (RCIs) 950, such as RCIs 950A and 950B. A record representing NFACs similar to NFAC 930 may be stored at an offloader registry maintained by a VCS in response to a programmatic registration request, and the configuration shown in FIG. 9 may be verified at the VCS via one or more types of automated acceptance tests prior to the deployment of an RPPS such as RPPS 902 for a client's RBA.

In some embodiments, in addition to RCIs, a given RPPS may also be used to run one or more general purpose compute instances, such as general purpose C1 951, which may not be optimized for radio-based applications. NFAC 930 may include an NFA 937 and a networking hardware device (NHD) 992 in the depicted embodiment. RPPS 902 may also comprise a number of other components, e.g., various persistent storage devices, which are not shown in FIG. 9. The primary physical processor set 904 may comprise a number of physical CPUs (pCPUs, also referred to as primary processors), including pCPUs 905A and 905B in the depicted embodiment. Virtualized versions of the pCPUs, called vCPUs or virtual CPUs, may be allocated to individual RCIs and/or general-purpose CIs by the PVM 970 during the lifetime of the compute instances. Each compute instance may comprise a respective instance of an operating system (e.g., operating systems 952A-952C) and a set of applications (e.g., 954A-954C) being run on behalf of one or more clients of a virtualized computing service (VCS) with functionality similar to VCS 110 of FIG. 1.

The PVM 970 may comprise an opportunistic stripped-down hypervisor 920 (which uses the pCPUs) and one or more offloaded virtualization manager components (OVMCs) which do not use the pCPUs in the depicted embodiment. OVMCs may include, for example, a virtualization controller 915 and a network processing offloader 916. The network processing offloader may perform some of the functions of a networking manager (such as networking managers 127 of FIG. 1) in some embodiments. Individual ones of the OVMCs may be implemented using a respective system-on-chip design in some embodiments, e.g., incorporated within a virtualization management offload card 910. Although the virtualization controller 915 and the network processing offloader 916 are shown as being incorporated within a single offload card 910 (e.g., a PCIe card) or offloader in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards or offloaders may be used for the virtualization controller 915 and the network processing offloader 916. The virtualization controller, as suggested by its name, may be responsible for organizing or orchestrating much of the virtualization management work performed at the RPPS 902 in the depicted embodiment—e.g., it may be the first of the components of the PVM to boot, trigger the launches of the other components of the PVM, communicate with the VCS control plane, make memory allocation decisions with respect to compute instances, and so on. The network processing offloader 916 may be responsible for implementing one or more networking protocols (including for example an encapsulation protocol used within the VCS) and acting as an intermediary between the compute instances and at least some networking endpoints outside the RPPS in the depicted embodiment. In at least one embodiment the network processing offloader may select a particular NHD (e.g., an NHD 977 at the VMOC 910, or an NHD 992 at an NFAC) to be used for a particular category of RPPS traffic.

Hypervisor 920 may be described as being stripped-down in the depicted embodiment because much of the work performed by at least some conventional hypervisors may be handled at the virtualization management offload card 910, thereby reducing the complexity and size of the hypervisor 920. In addition, hypervisor 920 may be designated as opportunistic because, under most circumstances, it may wait until a compute instance voluntarily relinquishes control of a pCPU 905 before the hypervisor uses CPU cycles. Thus, for example, when a particular compute instance 950 or 951 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the compute instance is not expecting to use the pCPU. As such, the hypervisor 920 may have a minimal impact on the performance of applications 954 (which may include radio-based applications) in the depicted embodiment.

The hypervisor 920 may itself comprise a number of subcomponents in the depicted embodiment, including a set of operating system kernel-level components 922, a hypervisor coordinator 925, one or more virtual machine (VM) managers 928, isolation/security components 929, and/or a messaging manager 931. The hypervisor coordinator 925, individual ones of the VM managers 928, the isolation/security components 929 and/or the messaging manager 931 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by compute instances, etc.).

The kernel-level components 922 may provide support for various low-level operations such as the initial responses to VM exit instructions issued by the compute instances (e.g., when a compute instance gives up a pCPU). The hypervisor coordinator 925, as implied by the name, may be responsible for orchestrating operations of the other subcomponents. The hypervisor coordinator 925 may, for example, implement an API which can be used for communications between the offloaded virtualization management components 915 and 916 and the hypervisor, initiating compute instance launches and terminations (e.g., at the request of the virtualization controller), exposing metrics collected by the VM managers, providing debugging capabilities, and so on.

Each VM manager 928 may be responsible for launching or instantiating a respective compute instance based on a specification provided by the coordinator 925, monitoring metrics and logs of the compute instance, and so on. In some embodiments a VM manager 928 may also help with compute-instance-requested I/O operations for certain devices, e.g., by trapping I/O requests and translating them to memory-mapped I/O operations completed with the help of an offloaded virtualization management component.

The messaging manager 931 may act as an intermediary between the virtualization controller 915 and the hypervisor, e.g., by translating commands issued using a queue-based protocol by the virtualization controller into pipe messages within the hypervisor. The security and isolation components 929 may be responsible, for example, for scrubbing or cleaning up compute instance memory when a compute instance terminates, so that inadvertent sharing of data across compute instances can be avoided.

L2 implementation programs of the kind discussed earlier may be run as part of the applications 954A or 954B of the RCIs in the depicted embodiment. In some embodiments, programs implementing L3 or CU functions may also or instead be run at RPPS 902, e.g., as part of applications 954A, 954B or 954C. Request handlers of the kind shown in FIG. 6 may be implemented in some embodiments as daemons within the operating systems 952A or 952B. In the embodiment shown in FIG. 9, a network function offloading manager 978, similar in functionality to the offloading managers discussed earlier, may be implemented at the virtualization management offload card. In other embodiments, as indicated earlier, such an offload manager may be implemented within the hypervisor 920. In the embodiment shown in FIG. 9, an RPPS 902 may comprise two types of offloaders: a VMOC 910 and an NFAC 930, each of which offloads work that might otherwise have to be performed at the primary physical processor set 904 of the server. In at least one embodiment, other types of offloaders may also be incorporated within a server managed by a VCS, e.g., in addition to or instead of a VMOC and/or an NFAC.

Figure 10:
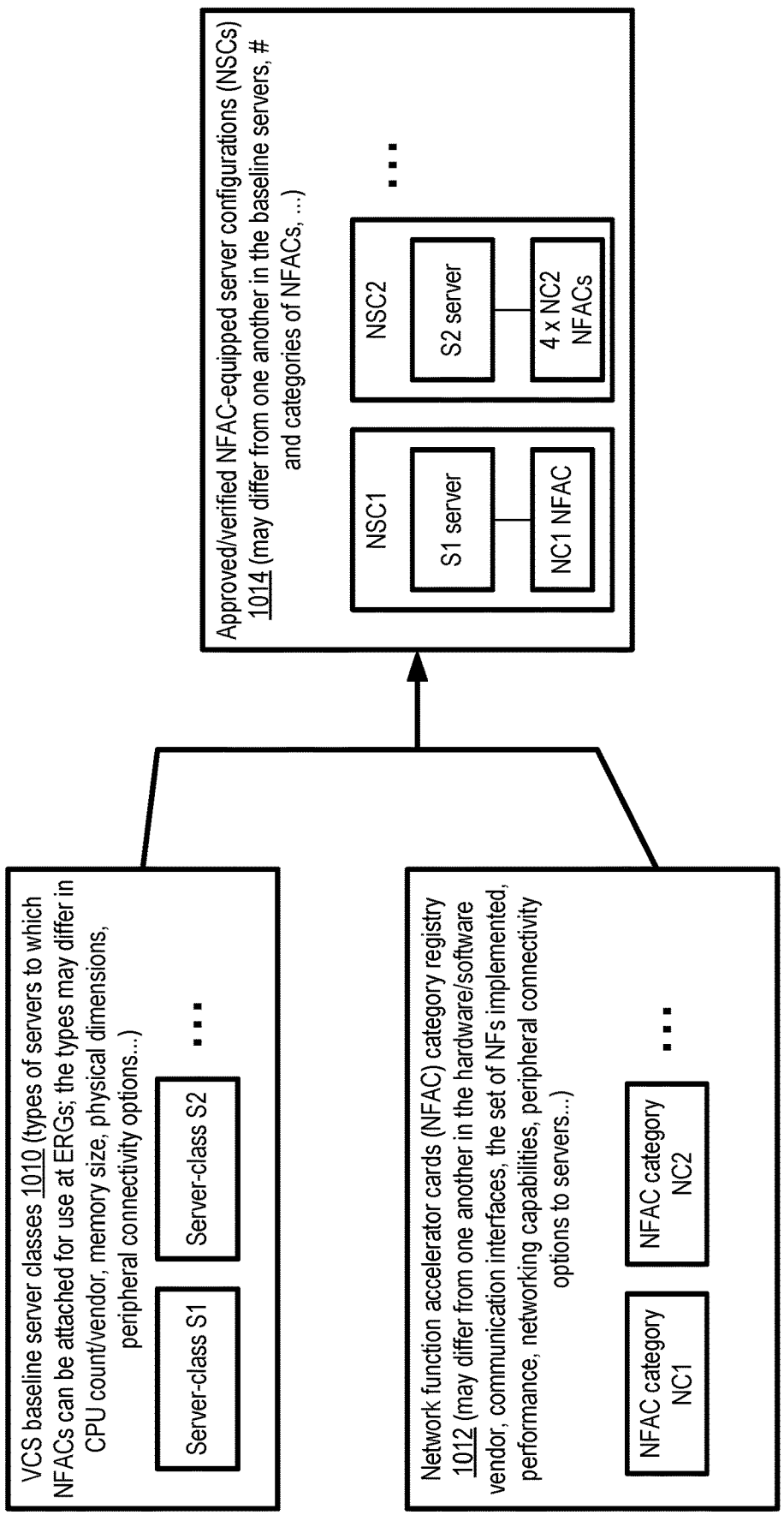
FIG. 10 illustrates an example scenario in which server configurations comprising registered network function accelerator cards attached to baseline servers of a virtualized computing service may be verified in response to requests from accelerator vendors, according to at least some embodiments.

FIG. 10 illustrates an example scenario in which server configurations comprising registered network function accelerator cards attached to baseline servers of a virtualized computing service may be verified in response to requests from accelerator vendors, according to at least some embodiments. In the embodiment depicted in FIG. 10, a virtualized computing service (VCS) similar in features and functionality to VCS 110 of FIG. 1 may have several classes of baseline servers to which NFACs and/or other offloading cards may be attached to support radio-based applications (RBAs). For example, VCS baseline server classes 1010 may include server-class S1, server-class S2 and the like, with the server classes differing from one another in attributes such as the total number of primary processors or CPUs, the vendor or manufacturer of the primary processors, the physical dimensions of the servers (e.g., how many 1-unit slots each server of a class takes up within an industry standard server rack), the types of peripheral interconnects (e.g., PCIe, USB, etc.) supported by the server for connectivity with offloader cards, etc. The server classes may be referred to as "baseline" classes because NFACs which enable RBAs to be run efficiently on the servers have not yet been attached to the servers.

In response to programmatic requests from NFAC hardware vendors or NFAC software vendors, representations of one or more categories of NFACs may be stored in a registry in the embodiment depicted in FIG. 10. For example, NFAC category registry 1012 may include records representing NFAC category NC1, NFAC category NC2, and the like, with the NFAC categories differing from one another in properties such as the hardware or software vendor, the communication interfaces and/or drivers used for transmitting requests/commands to the NFACs and receiving results from the NFACs, the set of network functions implemented at the NFACs, performance capacity, networking capabilities (e.g., how many ports for IP traffic are available at networking hardware devices of the NFACs, and what message rates/bandwidths are supported at the networking hardware devices), peripheral interconnect options for attaching the NFACs to baseline servers and the like. Some NFACs may, for example, present PCIe devices that support virtualization (e.g., via physical functions (PFs) or virtual functions (VFs) to the operating systems of a baseline server, and such PCIe devices may be used as interfaces for communication to and from the NFACs. A given vendor or third-party supplier may register multiple NFAC categories in some embodiments at a provider network by submitting respective programmatic registration requests. Some of the NFACs included in the registry may be designed and/or manufactured by the provider network operator in some embodiments.

A list or collection of approved/verified NFAC-equipped server configurations (NSCs) may be generated by attaching one or more NFACs of registered NFAC categories to servers of the classes 1010 in the depicted embodiment, and running various types of automated acceptance tests on the servers in the depicted embodiment. For example, approved/verified NSCs 1014 may include NSC1, in which one NFAC of category NC1 is attached to a server of baseline class S1, and NSC2 in which 4 NFACs of category NC2 are attached to a server of baseline class S2. Individual ones of the approved NSCs may be assigned respective unique configuration identifiers, which may then be utilized by VCS clients to submit requests for ERGs comprising RPPSs (with each of the RPPS configurations corresponding to an approved NSC). Descriptors of the approved NSCs, including the NSC identifiers which can be used to request ERG setup, may be provided via programmatic interfaces of a VCS in various embodiments. In at least some embodiments, a programmatic request from a vendor on whose behalf an NFAC is registered may trigger the automated acceptance testing of NSCs—for example, the vendor of NC1 NFACs may request that an S1 server with an NC1 NFAC attached be tested.

Figure 11:
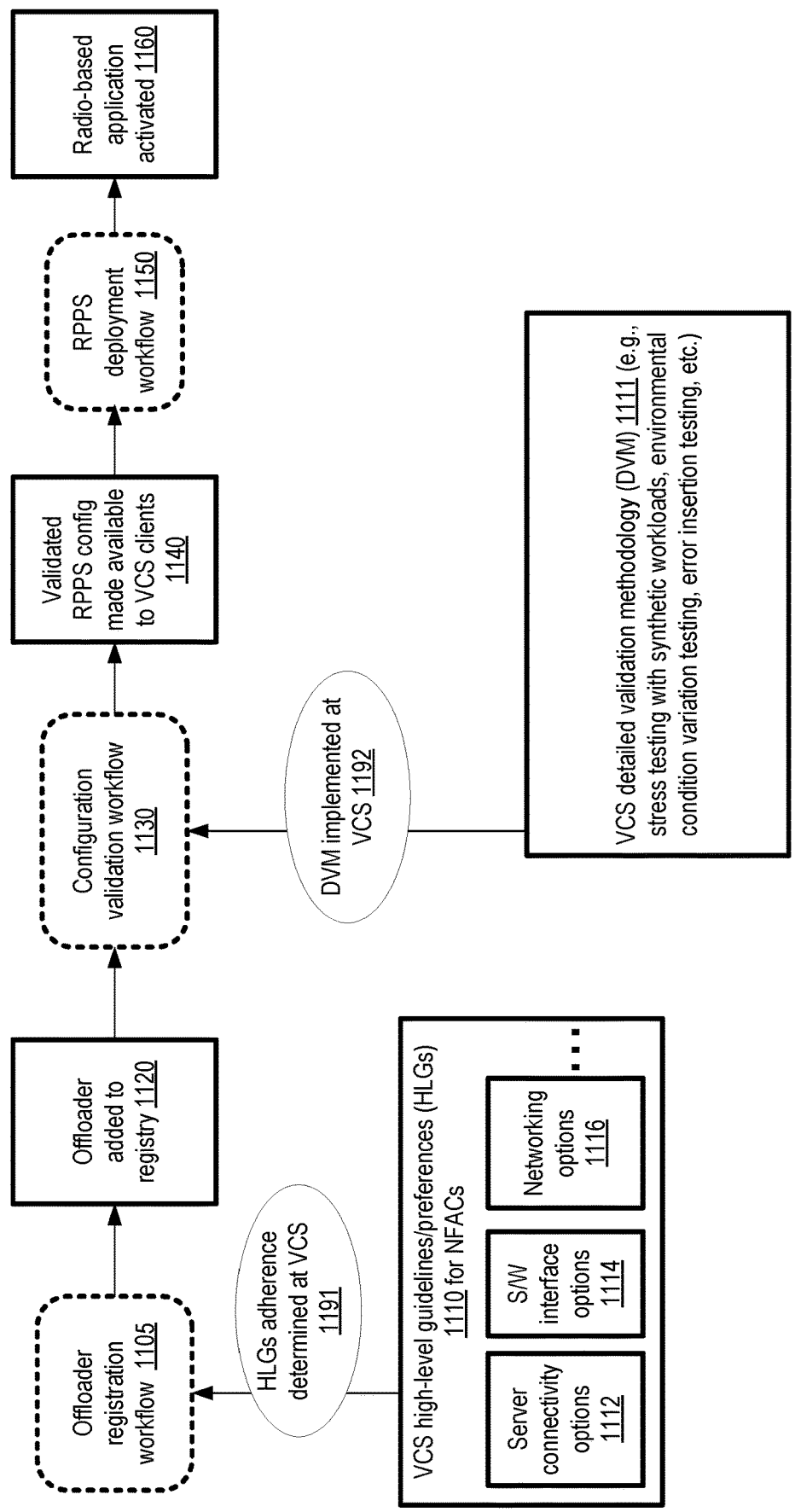
FIG. 11 illustrates an example workflow for automated onboarding of offloading devices for servers managed by a provider network, according to at least some embodiments.

FIG. 11 illustrates an example workflow for automated onboarding of offloading devices for servers managed by a provider network, according to at least some embodiments. The overall workflow may comprise an offloader registration workflow 1105, a configuration validation workflow 1130 and an RPPS deployment workflow 1150 in the depicted embodiment. The VCS at which an offloader is to be registered may provide a list of high-level guidelines/preferences (HLGs) 1110 for NFACs and/or other offloaders in the depicted embodiment. The guidelines or preferences may include, for example, one or more server connectivity options 1112 (e.g., PCIe, USB, and the like), one or more software interface options 1114 (e.g., the types of operating system accessible I/O devices that the NFACs can present), networking options (e.g., the number and speeds of networking hardware devices that an NFAC can include) in the depicted embodiment. Adherence or compliance of an NFAC with the HLGs may be determined in at automated manner (e.g., by analyzing contents of a registration request, which may include information about the properties of a to-be-registered NFAC which are covered in the HLGs) in at least some embodiments, as indicated in element 1191 of FIG. 11. An offloader which adheres to at least some of the HLGs may be added to the offloader registry maintained at the provider network as indicated in element 1120.

A detailed validation methodology (DVM) 1111 may be implemented at a VCS for a server configuration which includes one or more registered NFACs in the depicted embodiment, as indicated in element 1192. The DVM 1111 may for example comprise automated tests of several types on proposed server configurations which include registered NFACs, including stress testing with synthetic workloads, environmental condition variation testing (e.g., testing under extreme cold or extreme heat), error insertion testing and the like in different embodiments. The configuration validation workflow 1130 may be initiated, for example, by a third-party vendor of NFAC hardware or software, by submitting a server validation request indicating a baseline class server to which one or more NFACs are attached.

If the tests of the DVM succeed, the tested server configuration may be assigned a validated RPPS configuration identifier in the depicted embodiment, and information about the validated RPPS configuration may be made available to VCS clients 1140 via programmatic interfaces. The clients may then initiate RPPS deployment workflows 1150, e.g., by specifying the kinds of validated RPPS configurations they wish to have established as part of ERGs in various locations or premises. After the requested ERGs are setup, the clients' radio-based applications may be activated, as indicated in element 1160. As part of an RBA, one or more types of network functions may be executed at the NFAC or NFACs of a validated RPPS configuration.

Figure 12:
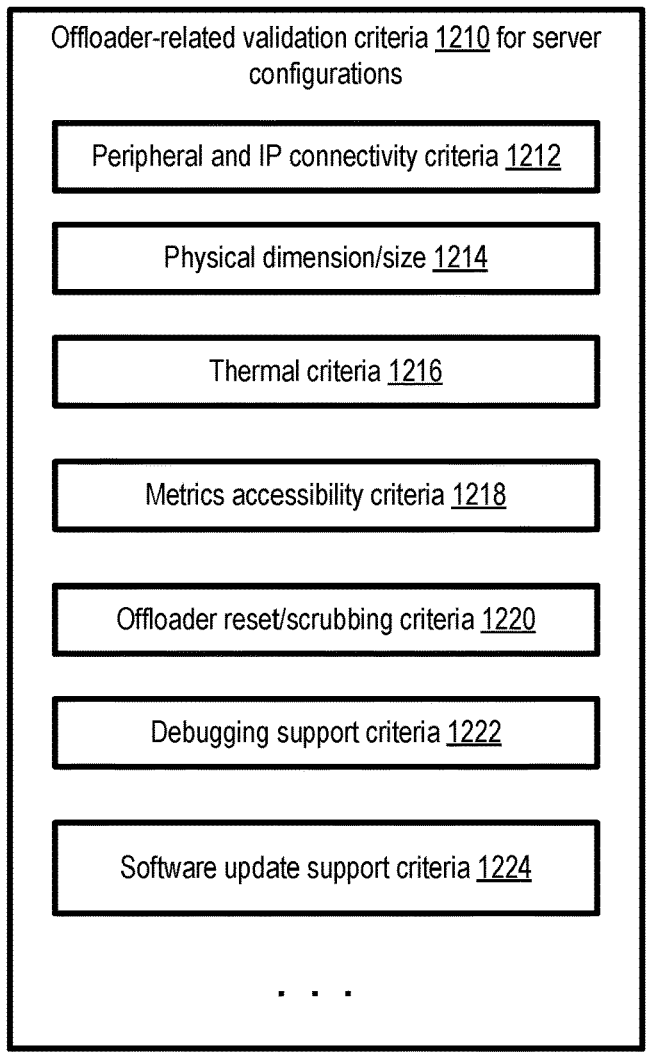
FIG. 12 illustrates example criteria for automated validation of offloaders at a provider network, according to at least some embodiments.

FIG. 12 illustrates example criteria for automated validation of offloaders at a provider network, according to at least some embodiments. As shown, offloader-related validation criteria 1210 for server configurations which can be set up at ERGs may include peripheral and IP connectivity criteria 1212, physical dimensions/sizes 1214 of the servers after the offloaders have been attached, thermal criteria 1216, metrics accessibility criteria 1218, offloader reset/scrubbing criteria 1220, debugging support criteria 1222, and software update support criteria 1224 in the depicted embodiment.

The VCS may specify connectivity criteria 1212 which have to be met by NFACs, such as the kinds of peripheral interconnects supported at the VCS baseline servers to which NFACs are to be physically attached, and/or the kinds of wired (e.g., Ethernet-based) or wireless IP connectivity support expected or desired from the NFAC's networking hardware, and so on in various embodiments. Physical dimension criteria 1214 may be indicated by the VCS to ensure that the servers configured with one or more NFACs is able to fit within an enclosure or form factor of a targeted size. Thermal criteria 1216 may depend for example on the environmental conditions expected at the facilities or premises at which ERGs are to be set up on behalf of clients—e.g., some ERGs may be set up at sites at which data center-level cooling/heating systems are available, while other ERGs may be set up at premises (or outdoor locations) whose temperature is not controlled to the same extent as data centers.

In order to be approved for inclusion in an RPPS configuration which can be requested by VCS clients, in some embodiments an NFAC or other types of offloaders may be required to provide certain standardized metrics defined by the VCS, e.g., via programmatic interfaces defined by the VCS. Metrics accessibility criteria 1218 may indicate two kinds of metrics-related requirements in one embodiment: requirements for metrics which can be extracted from an offloader by querying the offloader (e.g., from an operating system of a server, or from a virtualization management component of a server), as well as streams of metrics which the offloader is expected to transmit or push to specified destinations such as a metrics collection and presentation service without receiving explicit requests for the metrics.

Offloader reset/scrubbing criteria 1220 may indicate that the vendor or registrant at whose request an offloader category has been registered at the VCS should provide techniques (e.g., commands or executable programs) that can delete data stored at an NFAC or offloader, so that for example the same NFAC can be reused for other applications without potential leakage of data. A mechanism for "factory reset" of an offloader, in which customizations made to the configuration or data of an offloader after it is brought online are in effect undone, may be required in some embodiments as part of the reset/scrubbing criteria.

An offloader such as an NFAC may be required to provide techniques for debugging or trouble-shooting problems in some embodiments, as part of debugging support criteria 1222. Such techniques may for example include analogs of memory or core dump commands, configuration change history/undo commands, and the like. In at least one embodiment, an offloader may be required to support software update techniques that do not disrupt running applications (or only cause short-term disruptions that do not last more than a specified amount of time); such requirements for software updates may be included within the software update support criteria 1224.

Tests for automating the checking of some or all of the validation criteria 1210 may be executed at the VCS, e.g., as part of a detailed validation methodology of the kind discussed in the context of FIG. 11, in response to programmatic requests from the suppliers/vendors of the offloaders who wish to have server configurations incorporating their offloaders made available to VCS clients. Note that at least in some embodiments, while tests may be conducted at a VCS with respect to numerous validation criteria of the kind discussed in the context of FIG. 12 and FIG. 11, a given offloader or server need not necessarily satisfy all the criteria to be accepted or validated. Instead, some offloader-equipped configurations may be approved even though a few of the requirements are not satisfied, and an indication of the specific criteria which were not satisfied may be provided to the clients who wish to utilize the configurations for their applications. As such, one or more of the criteria may be advisory rather than mandatory in such embodiments.

Figure 13:
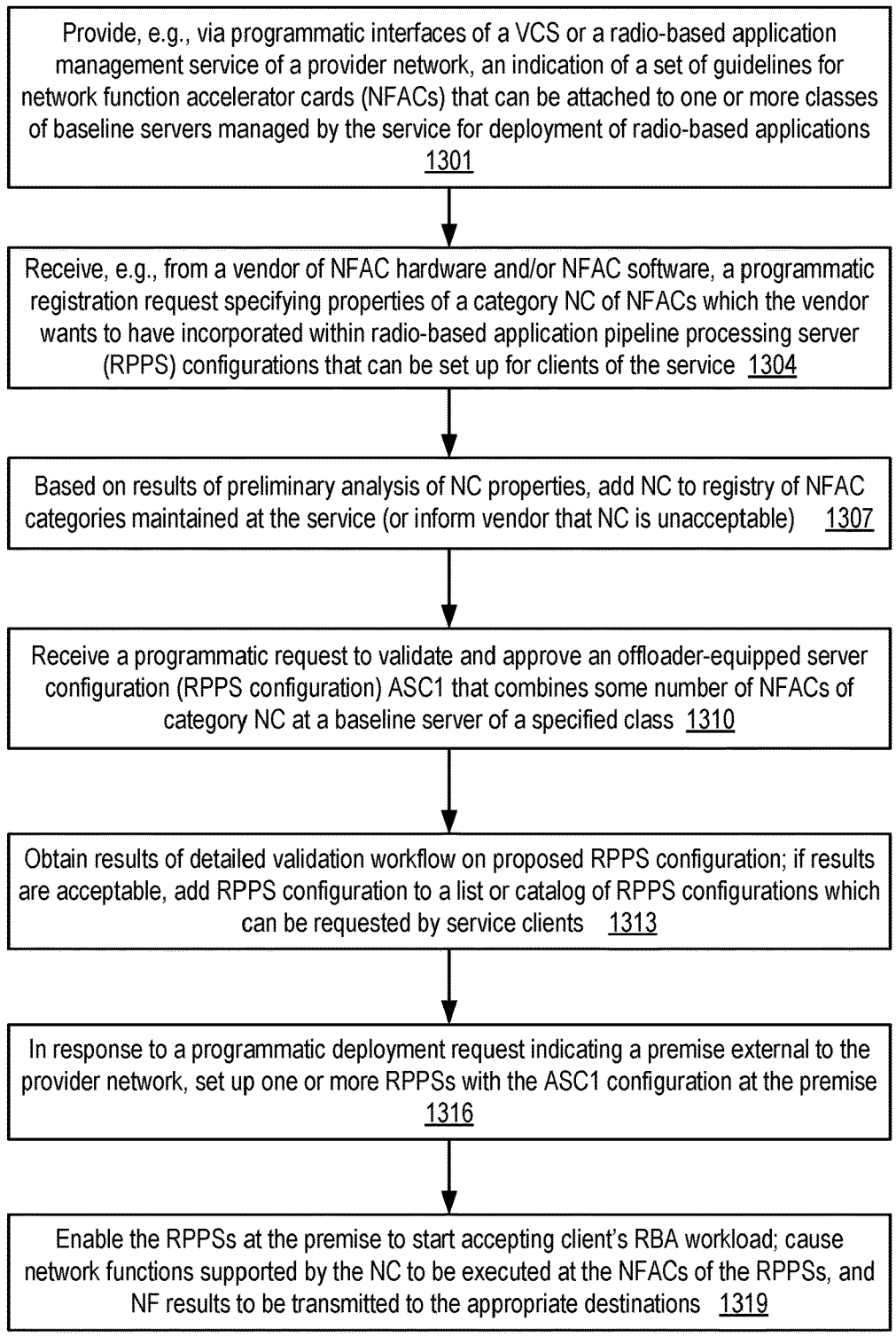
FIG. 13 is a flow diagram illustrating aspects of operations that may be performed to automate onboarding of accelerators for servers managed by a provider network, according to at least some embodiments.

FIG. 13 is a flow diagram illustrating aspects of operations that may be performed to automate onboarding of accelerators for servers managed by a provider network, according to at least some embodiments. As shown in element 1301, an indication of a set of guidelines for network function accelerator cards (NFACs) that can potentially be attached to one or more classes of baseline servers for deployment of radio-based applications may be provided, e.g., via programmatic interfaces of a VCS or a radio-based application management service of a cloud provider network. The guidelines may be presented, for example, to enable designers, manufacturers or vendors of various types of task offloader hardware and/or software to get a sense of the kinds of NFAC characteristics that are likely to render the NFACs acceptable for inclusion or attachment to servers that are going to be managed (for example, as part of extension resource groups or ERGs) by the cloud provider network. Some guidelines may indicate mandatory properties, while other guidelines may be advisory in at least some embodiments.

According to various embodiments, a programmatic registration request specifying properties of a category NC of NFACs which a vendor wishes to have incorporated within one or more RPPS configurations that can be set up for clients of the service may be received at the provider network (element 1304). A registration request may, for example, indicate one or more types of network functions (such as network functions shown in FIG. 4) that the NFAC is designed to perform, information about the communication interface(s) (such as PCIe interfaces, USB interfaces, Ethernet, etc.) supported by the NFAC, and so on.

In some embodiments, based on successful results of a preliminary automated analysis of the claimed properties of NC, NC may be added to a registry of NFAC categories maintained at the service (element 1307). If the preliminary automated analysis indicates that NC is unacceptable, the vendor may be informed accordingly in the depicted embodiment. According to at least some embodiments, after information about one or more properties of the NC is received (e.g., in the registration request or in a separate message), the provider network service may transmit an indication of one or more candidate classes of baseline servers to which offloaders of NC can potentially be attached. In at least some embodiments, the registry may be publicly accessible via programmatic interfaces of the provider network service. Such a public registry may potentially lead to collaboration among NFAC vendors, and may in some cases help NFAC vendors avoid duplicative work.

A programmatic request to validate and approve an offloader-equipped server configuration ASC1 (e.g., a configuration of an RPPS that can be installed as part of external resource groups (ERGs)) may be received at the provider network service (element 1310) in various embodiments. Servers with configuration ASC1 may comprise a baseline server of the provider network to which one or more registered NFACs are attached, e.g., via peripheral interconnects such as PCIe or USB. In some cases, the vendor that submitted the registration request for the category of NFAC which is attached to the baseline servers may submit such a server configuration validation request. In at least one embodiment, a client of the provider network who wishes to utilize a registered NFAC for their RBA may submit a server configuration validation request, or other entities may submit the server configuration validation request. In at least one embodiment, a given server configuration for which a configuration validation request may comprise more than one registered NFACs (either from the same vendor or registration request submitter, or from different vendors or registration request submitters). For example, NFAC vendor A may have registered NFACs of category Cat1, NFAC vendor B may have registered NFACs of category Cat2, and a request to validate a server configuration which comprises one Cat1 NFAC and one Cat2 NFAC attached to the same baseline server may be received at the provider network. Such a request may, for example, be the result of a collaboration between vendors A and B.

A detailed validation workflow may be conducted on one or more servers with the proposed RPPS configuration in response to the request for configuration validation in the depicted embodiment. A variety of automated tests may be conducted in some embodiments at the provider network, including for example tests for validating some or all of the criteria shown in FIG. 12. If the results are acceptable, the proposed RPPS configuration may be added to a list or catalog of RPPS configurations which can be requested programmatically by clients of the provider network (element 1313). Each such approved configuration may be assigned a respective configuration identifier in some embodiments, and the identifiers may be made accessible along with configuration descriptions, e.g., to make it easier for clients to specify the servers they wish to utilize at premises of their choice. If the results of the detailed validation are unacceptable, the requester of the server configuration validation may be informed accordingly.

In response to a programmatic RPPS deployment request, e.g., indicating a premise external to the provider network data centers, one or more RPPSs with a configuration ASC1 indicated in the deployment request may be set up as part of an ERG at the premise in the depicted embodiment (element 1316). In some embodiments, instead of requesting deployment of one or more servers at an external premise, a client may request the deployment of servers with approved/validated offloader-equipped configurations at a provider network data center, or permit the provider network service to choose the location of the servers. Such a client may utilize offloader functionality for their applications without requiring ERGs to be set up at external premises.

In embodiments in which the RPPSs with ASC1 configurations are set up for client's RBAs in response to the deployment requests, the RPPSs may be enabled or activated to start accepting messages (e.g., from layers of the radio-based technology stack which are not implemented at the RPPSs themselves) representing the workload of the RBAs (element 1319). In response to such messages, one or more network functions of an RBA may be performed or executed at the NFACs of the RPPSs, and the results of then network functions may be sent to the appropriate destination (e.g., a radio unit (RU)) or a centralized unit (CU) in a scenario in which the RPPS is being used to implement distributed unit (DU) functionality). A request to execute a network function at an NFAC may be received, for example, at the NFAC using the types of communication interfaces indicated earlier in the corresponding registration request in the depicted embodiment. Similarly, results of the execution of a network function may be transmitted via the communication interfaces indicated in the registration request in at least some embodiments. It is noted that in various embodiments, some of the operations shown in the FIG. 13 may be implemented in a different order than that shown in the figure, or may be performed in parallel rather than sequentially. Additionally, some of the operations shown in FIG. 13 may not be required in one or more implementations.

Figure 14:
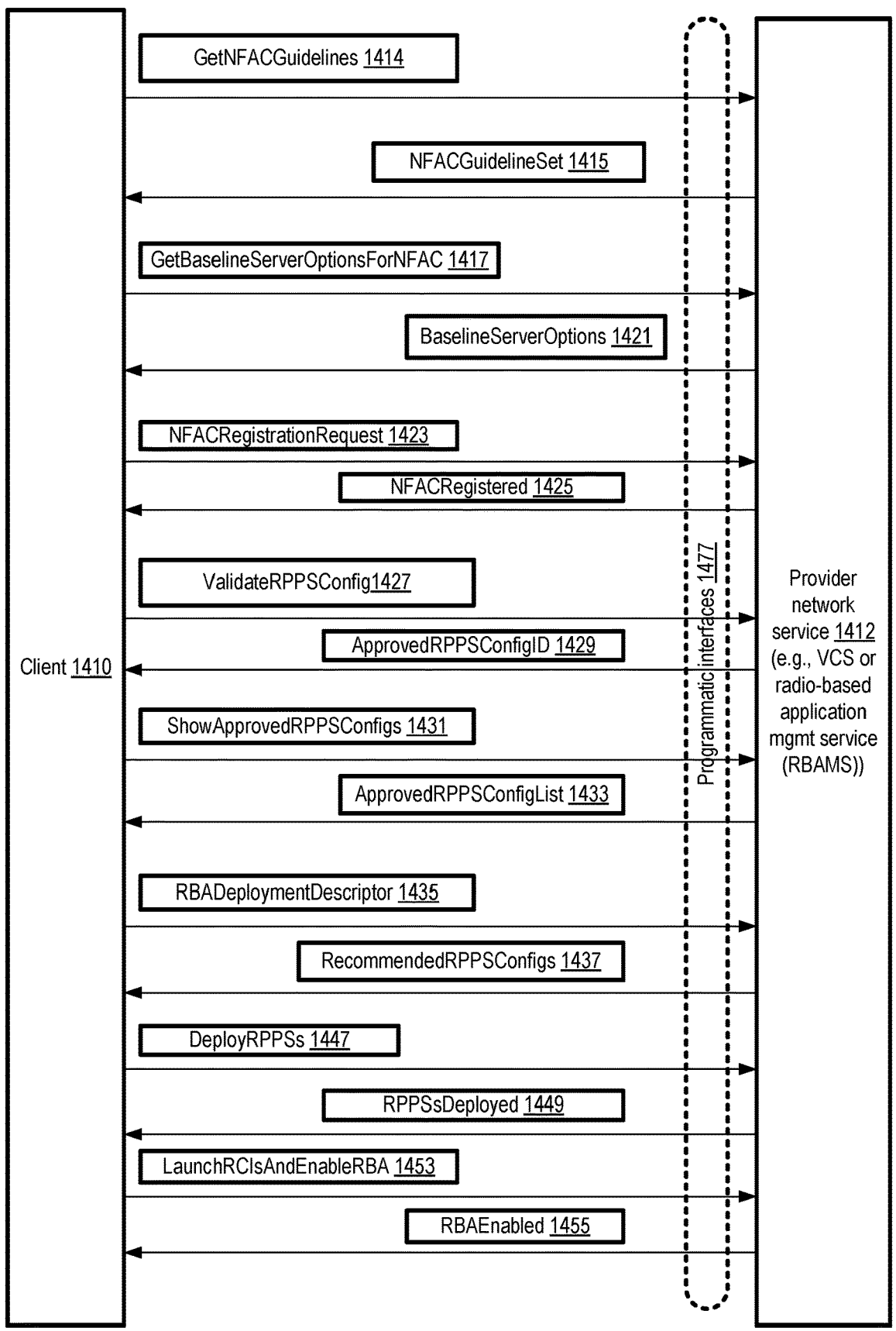
FIG. 14 illustrates example programmatic interactions, pertaining to onboarding and use of network function accelerators, between clients and a provider network service, according to at least some embodiments.

FIG. 14 illustrates example programmatic interactions, pertaining to onboarding and use of network function accelerators, between clients and a provider network service, according to at least some embodiments. In the depicted embodiment, a provider network service 1412 (such as a VCS or a radio-based application management service (RBAMS)) may implement a set of programmatic interfaces 1477, such as web-based consoles, command-line tools, graphical user interfaces, APIs and the like, which can be utilized by service clients to submit messages or requests to the service and receive corresponding responses. Note that several different types of service clients may utilize programmatic interfaces 1477 in some embodiments, including vendors of NFAC hardware or software, designers or owners of radio-based applications (RBAs) and the like.

A client 1410 of the provider network service may utilize the programmatic interfaces 1477 to obtain or view guidelines for acceptable NFACs in the depicted embodiment, e.g., by submitting a GetNFACGuidelines request 1414. In response, a set of high-level guidelines or preferences (similar to the HLGs 1110 shown in FIG. 11) may be presented to the client, e.g., in one or more NFACGuidelines messages 1415 in the depicted embodiment. In some embodiments, the guidelines may be presented via publicly-accessible web pages.

In some cases, a client may wish to identify one or more classes of baseline servers of the provider network, to which NFACs with specified properties can potentially be attached. A GetBaselineServerOptionsForNFAC message 1417 may be submitted via programmatic interfaces 1477 in some embodiments, indicating properties of a particular category of NFAC, to obtain a list of classes of baseline servers likely to be compatible with (e.g., capable of being attached to). The list of compatible baseline server classes, if any such servers are supported by the provider network service, may be provided to the client via one or more BaselineServerOptions messages 1421.

An NFACRegistrationRequest message 1423 may be submitted by a client request the provider network service to include a category of NFACs within a registry of offloaders in the depicted embodiment. Various properties of the NFACs, including for example the kinds of network functions which can be executed at the NFACs, the communication interfaces of the NFACs, and so on may be indicated in the registration request in some embodiments. In response, a preliminary automated analysis may be conducted on the NFAC category indicated in the registration request in some embodiments, and a representation of the NFAC category may be added to the registry in the depicted embodiment if the results of the preliminary analysis are satisfactory. An NFACRegistered message 1425 may be sent to the client in at least some embodiments. Over time, more NFAC categories may be added to the registry maintained by the service. The registered categories may differ from one another, for example, in the types of offloaded network functions, performance capacity, an input/output (I/O) or communication interfaces, attachable classes of baseline servers, the set of compatible server software (software which has to run on a baseline server to use the NFACs), and so on.

In at least some embodiments, a ValidateRPPSConfig request 1427 may be submitted by a client 1410 via the programmatic interfaces, requesting the provider network service to validate and approve a server configuration in which one or more registered NFACs are attached to a baseline server. In response to such a request, a detailed validation workflow may be initiated at the provider network, in which the proposed server configuration is tested to determine whether it satisfies acceptance criteria of the service. The automated tests conducted may include, for example, tests to check thermal properties, physical size, metrics accessibility, reset functionality, debugging support and/or software update support. If the proposed NFAC-equipped server configuration meets acceptance criteria, it may be approved and a configuration identifier may be generated for it in at least some embodiments. The configuration identifier may be sent to the client in an ApprovedRPPSConfigID message 1429 in the depicted embodiment. The configuration identifier and details about the approved configuration (including for example the results of various tests conducted on the configuration prior to approval) may be stored at a repository maintained at the provider network service in some embodiments.

A client who wishes to utilize offloader-equipped servers for their applications may submit a ShowApprovedRPPSConfigs request 1431 via programmatic interfaces 1477 in one embodiment. An ApprovedRPPSConfigList 1433, detailing the approved RPPS configurations, at least some of which include one or more registered offloaders, may be sent to the client in response. In various embodiments, the provider network service 1412 may present clients or customers with available options for servers equipped with a variety of registered offloader cards such as NFACs from different vendors, NFACs implementing different combinations of network functions (such as RAN layer-1 network functions, core network functions and the like). Clients may be presented with available options for different vendors whose offloaders can be used for a desired set of network functions of one or more layers of the radio-based technology stack in some embodiments. If a client chooses a particular vendor, say vendor-A, or some combination of vendors such as vendor-A or vendor-B, from among the list of vendors whose offloaders can be included in a server, the provider network service may then present a filtered list of approved server configurations from the selected vendors. In some embodiments, a client may specify a preferred vendor or vendors programmatically without viewing a list of vendors first, and a filtered list of server configurations equipped with offloaders from the preferred vendor or vendors may be provided to the client. Other types of filtering requests with respect to available or approved server configurations, such as filtering based on network function type, filtering based on server size or performance for a specified network function, may also be supported via the programmatic interfaces 1477 in various embodiments. In some embodiments, the client may indicate properties of the applications for which the client wishes to utilize the RPPSs, and the application properties may be used at the provider network service to select a subset of the approved RPPS configurations which are suitable for the client. In at least one embodiment, a set of test results obtained from the approved RPPS configurations (e.g., during the detailed validation workflow) may be provided to the client along with the identifiers of the approved configurations.

A client such as a 5G application designer or vendor may submit a descriptor of deployment requirements for an RBA to the service in some embodiments, e.g., via an RBADeploymentDescriptor message 1435. The deployment descriptor may for example indicate the kinds of network functions expected to be performed for the RBA at RPPSs, the anticipated rates of requests for the network functions, the geographical locations at which the RPPSs are expected to be set up, and so on. In response, the service may analyze the descriptor to identify approved RPPS configurations which may be suitable for the client's RBAs. Information about the suitable RPPSs may be provided to the client via one or more RecommendedRPPSConfigs messages 1437 in the depicted embodiment.

A DeployRPPSs request 1447 may be sent by a client to request the setup of RPPSs, e.g., as part of an extension resource group at a premise external to the provider network's data centers in some embodiments. The DeployRPPSs request may represent an order for one or more servers equipped with registered offloaders to be configured at a specified site. In some embodiments, a client may submit a DeployVCSERG request to order a desired combination of RPPSs to be configured at a specified site as part of a VCS extension resource group, with at least some of the servers equipped with registered offloaders. A workflow for deployment of the RPPS may be initiated by the provider network service, and an RPPSsDeployed message 1449 may be sent to the client when the requested RPPSs have been installed and at least partially configured. The client may submit one or more LaunchRCIsAndEnableRBA requests 1453 to request that radio-optimized compute instances (RCIs) be instantiated at the RPPSs, and processing of messages of the RBA be initiated. The RCIs may then be launched/activated, and an RBAEnabled response message 1455 may be sent to the client. The RPPSs at which the RCIs are launched may start accepting RBA messages. In response to at least some such messages, requests for network functions may be sent to the NFACs of the RPPSs, and the network functions may be executed at the NFACs. Results of the NFACs may be sent to the appropriate destinations. Other types of programmatic interactions pertaining to the configuration and use of offloader-equipped servers managed by the provider network service may be supported in some embodiments than those shown in FIG. 14.

Resources of a provider network at which a VCS similar to VCS 110 of FIG. 1 may be organized into several regional zones in one embodiment. A given regional zone may in turn comprise one or more data centers located relatively close to each other (e.g., within the same state or metropolitan area). Each such data center may comprise control plane and data plane resources and artifacts of one or more services such as the VCS and/or a radio-based application management service (RBAMS) similar to RBAMS 192 of FIG. 1. RPPSs of the kind described above may be configured, in response to programmatic requests from clients, at a variety of facilities other than the provider network's own data centers in some embodiments. Such facilities may include, among others, cell sites (e.g., a room or group of rooms located next to cell towers with antennas), client premises such as local data centers, local zones, and/or point-of-presence sites in different embodiments. From each RPPS at a given facility, connectivity may be established with the control plane components of the provider network (e.g., via extension traffic intermediaries of the kind discussed in the context of FIG. 1) in various embodiments, and with radio units (RUs) typically located very near or in the facilities. After such connectivity has been verified, in various embodiments software components such as isolated request handlers and offloading managers may be launched at the RPPSs to process radio-based applications as described earlier.

Figure 15:
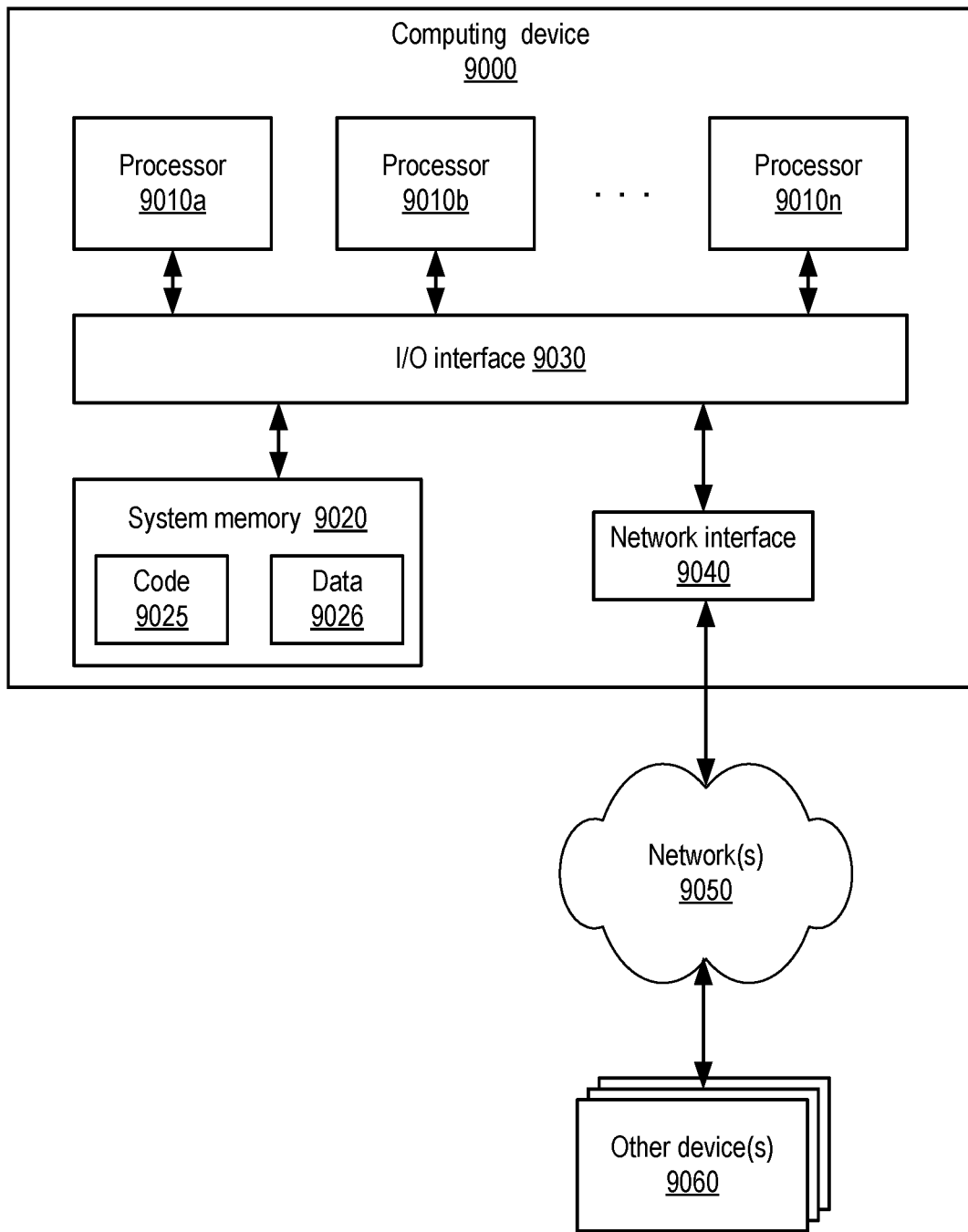
FIG. 15 is a block diagram illustrating an example computing device that may be used in at least some embodiments.

In at least some embodiments, a server that implements the types of techniques described herein (e.g., various functions of a provider network service such as a VCS, including functions within the provider network service as well as at extension sites), may include a general-purpose computer system that includes or is configured to access one or more computer-accessible media. FIG. 15 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 14, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 14. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

a computing device;

wherein the computing device includes instructions that upon execution on the computing device:

in response to obtaining, via one or more programmatic interfaces of a cloud provider network, a registration request for a category of network function offloaders, store a representation of the category within a registry of categories of network function offloaders which can be configured for one or more classes of servers of the cloud provider network, wherein the registration request indicates (a) a type of network function which can be offloaded from primary processors of a server of a particular class of the one or more classes and implemented using the network function offloaders of the category and (b) a communication interface of the network function offloaders of the category;

present, by the cloud provider network via the one or more programmatic interfaces, an indication of one or more server configurations, wherein individual ones of the server configurations of the one or more server configurations comprise one or more network function offloaders belonging to a category of network function offloaders whose representation is included in the registry, wherein individual ones of the server configurations of the one or more server configurations can be requested by clients of the cloud provider network, and wherein the one or more server configurations include a particular server configuration which comprises (a) a server of the particular class and (b) at least one network function offloader of the category;

cause a particular server with the particular server configuration to be activated at a premise external to a data center of the cloud provider network in response to a programmatic request from a client of the cloud provider network; and cause a network function of the type of network function to be executed using a particular network function offloader of the category at the particular server, wherein the network function is communicated to the particular network function offloader via the communication interface indicated in the registration request.

2. The system as recited in claim 1, wherein the computing device includes further instructions that upon execution on the computing device:

in response to verifying that the particular server configuration satisfies one or more validation criteria, generate, at the cloud provider network, a configuration identifier for the particular server configuration, wherein the programmatic request from the client indicates the configuration identifier.

3. The system as recited in claim 2, wherein the one or more validation criteria include one or more of: (a) a thermal criterion, (b) a physical size criterion, (c) a metrics accessibility criterion, (d) a reset functionality criterion, (e) a debugging support criterion or (f) a software update support criterion.

4. The system as recited in claim 2, wherein the configuration identifier is generated in response to a programmatic request from a vendor of the category of network function offloaders.

5. The system as recited in claim 1, wherein the computing device includes further instructions that upon execution on the computing device:

in response to receiving an indication of one or more properties of the network function offloaders of the category, transmit, from the cloud provider network to a submitter of the registration request, an indication of one or more candidate classes of the one or more classes of servers to which the network function offloaders of the category can be attached, wherein the one or more candidate classes include the particular class.

6. A computer-implemented method, comprising:

in response to obtaining, via one or more programmatic interfaces, a descriptor of a first category of network function offloaders, storing a representation of the first category within a database of categories of offloaders which can be attached to servers of one or more classes, wherein the descriptor indicates a type of network function which can be offloaded from primary processors of a server of a particular class of the one or more classes and implemented using network function offloaders of the first category;

providing, via the one or more programmatic interfaces, an indication of one or more server configurations, wherein individual ones of the one or more server configurations comprise one or more offloaders represented in the database, and wherein a first server configuration of the one or more server configurations includes (a) a server of the particular class and (b) at least one network function offloader of the first category of network function offloaders; and causing a network function of the type of network function to be executed using a particular network function offloader of the first category at a particular server with the first server configuration.

7. The computer-implemented method as recited in claim 6, further comprising:

in response to verifying that the first server configuration satisfies one or more validation criteria, generating a configuration identifier for the first server configuration, wherein the particular server is configured in response to a programmatic request which includes the configuration identifier.

8. The computer-implemented method as recited in claim 7, wherein the one or more validation criteria include one or more of: (a) a thermal criterion, (b) a physical size criterion, (c) a metrics accessibility criterion, (d) a reset functionality criterion, (e) a debugging support criterion or (f) a software update support criterion.

9. The computer-implemented method as recited in claim 7, wherein the configuration identifier is generated in response to another programmatic request, wherein the other programmatic request is received from a vendor of the first category of network function offloaders.

10. The computer-implemented method as recited in claim 6, wherein the particular network function offloader comprises a hardware card, and wherein the descriptor of the first category is obtained from a vendor of the hardware card.

11. The computer-implemented method as recited in claim 6, wherein the particular network function offloader comprises a hardware card, and wherein the descriptor of the first category is obtained from a vendor of software or firmware executed at the hardware card.

12. The computer-implemented method as recited in claim 6, wherein the particular network function offloader comprises a hardware card, wherein the hardware card is connected to a primary processor of the particular server via a peripheral interconnect.

13. The computer-implemented method as recited in claim 6, further comprising:
storing a representation of a second category of network function offloaders within the database in response to receiving a descriptor of the second category, wherein a network function offloader of the second category differs from a network function offloader of the first category in one or more of: (a) an offloaded network function type, (b) a performance capacity, (c) an input/output (I/O) interface, (d) an attachable server class, or (e) a set of compatible server software.

14. The computer-implemented method as recited in claim 6, further comprising:
obtaining a set of deployment requirements of a radio-based application; and
transmitting, via the one or more programmatic interfaces, an indication of a plurality of server configurations which can satisfy at least a subset of the set of deployment requirements, wherein the plurality of server configurations includes the first server configuration and a second server configuration, wherein a programmatic request for the particular server is received after said transmitting.

15. The computer-implemented method as recited in claim 6, further comprising:
providing, via the one or more programmatic interfaces, an indication of one or more test results for respective server configurations including the first server configuration and a second server configuration, wherein a programmatic request for the particular server is received after the indication of the one or more test results is provided.

16. A non-transitory computer-accessible storage medium storing program instructions that when executed on a processor:
in response to obtaining, via one or more programmatic interfaces, a descriptor of a first category of task offloaders, store a representation of the first category within a database of categories of offloaders which can be attached to servers of one or more classes, wherein the descriptor indicates a particular type of task which can be offloaded from primary processors of a server of a particular class of the one or more classes and implemented using a task offloader of the first category;
provide, via the one or more programmatic interfaces, an indication of one or more server configurations, wherein individual ones of the one or more server configurations comprise one or more offloaders of categories represented in the database, and wherein a first server configuration of the one or more server configurations includes (a) a server of the particular class and (b) at least one task offloader of the first category; and
cause a task of the particular type of task to be executed using a task offloader of the first category at a particular server with the first server configuration.

17. The non-transitory computer-accessible storage medium as recited in claim 16, storing further program instructions that when executed on the processor:
in response to verifying that the first server configuration satisfies one or more validation criteria, generate a configuration identifier for the first server configuration, wherein the particular server is activated in response to one or more programmatic requests which indicate the configuration identifier.

18. The non-transitory computer-accessible storage medium as recited in claim 17, wherein the one or more validation criteria include one or more of: (a) a thermal criterion, (b) a physical size criterion, (c) a metrics accessibility criterion, (d) a reset functionality criterion, (e) a debugging support criterion or (f) a software update support criterion.

19. The non-transitory computer-accessible storage medium as recited in claim 16, wherein the particular type of task includes one or more network functions of a radio-based technology stack, and wherein the one or more network functions comprise one or more of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function.

20. The non-transitory computer-accessible storage medium as recited in claim 16, storing further program instructions that when executed on the processor:
obtain a set of deployment requirements of an application; and
transmit, via the one or more programmatic interfaces, an indication of a plurality of server configurations which can satisfy at least a subset of the set of deployment requirements, wherein the plurality of server configurations includes the first server configuration and a second server configuration, wherein the second server configuration comprises a task offloader of another category, and wherein a performance capacity of the second server configuration differs from a performance capacity of the first server configuration.

\* \* \* \* \*